US012482396B2

(12) United States Patent
Li et al.

(10) Patent No.: US 12,482,396 B2
(45) Date of Patent: Nov. 25, 2025

(54) DISPLAY DEVICE AND METHOD OF TRANSMITTING SIGNALS IN DISPLAY DEVICE

(71) Applicant: NOVATEK Microelectronics Corp., Hsin-Chu (TW)

(72) Inventors: Chien-Hao Li, Tainan (TW); Jen-Chieh Hu, Hsinchu County (TW); Syang-Yun Tzeng, Taoyuan (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/370,865

(22) Filed: Sep. 20, 2023

(65) Prior Publication Data

US 2024/0096259 A1 Mar. 21, 2024

Related U.S. Application Data

(63) Continuation-in-part of application No. 18/233,006, filed on Aug. 11, 2023, now abandoned.

(60) Provisional application No. 63/408,825, filed on Sep. 21, 2022.

(51) Int. Cl.
*G09G 3/20* (2006.01)

(52) U.S. Cl.
CPC ... *G09G 3/2088* (2013.01); *G09G 2300/0408* (2013.01); *G09G 2310/0208* (2013.01); *G09G 2310/061* (2013.01); *G09G 2310/08* (2013.01); *G09G 2340/0435* (2013.01); *G09G 2370/08* (2013.01)

(58) Field of Classification Search
CPC ...... G09G 3/3611; G09G 3/36; G09G 3/3685; G09G 2370/08; G09G 2340/0435; G09G 2330/06
See application file for complete search history.

(56) References Cited

U.S. PATENT DOCUMENTS

| | | | | |
|---|---|---|---|---|
| 2009/0096775 A1* | 4/2009 | Lin | H04L 25/0272 345/213 |
| 2009/0167791 A1* | 7/2009 | Shiomi | G09G 3/3688 345/84 |
| 2012/0215952 A1 | 8/2012 | Werner | |
| 2016/0284313 A1* | 9/2016 | Lin | G09G 5/18 |
| 2018/0182064 A1 | 6/2018 | Uehara | |
| 2019/0244556 A1* | 8/2019 | Yoon | G09G 3/2096 |
| 2020/0210015 A1* | 7/2020 | Cheng | G09G 3/20 |
| 2020/0388237 A1* | 12/2020 | Tu | G09G 3/3685 |
| 2022/0028318 A1 | 1/2022 | Ji | |
| 2022/0108656 A1* | 4/2022 | Lee | G09G 3/3275 |

(Continued)

FOREIGN PATENT DOCUMENTS

| | | |
|---|---|---|
| TW | 201635263 A | 10/2016 |
| TW | 202034296 | 9/2020 |

(Continued)

*Primary Examiner* — Yuzhen Shen
(74) *Attorney, Agent, or Firm* — Winston Hsu

(57) ABSTRACT

A method of transmitting signals in a display device includes receiving a first data signal at a first data rate in a first time interval, and receiving a second data signal at a second data rate in a second time interval. The second data signal is generated at the second data rate, the second data rate is different from the first data rate, and the second time interval is non-overlapping with the first time interval.

23 Claims, 26 Drawing Sheets

(56) References Cited

U.S. PATENT DOCUMENTS

2022/0165194 A1* 5/2022 Akiba .................. G09G 3/2096
2022/0189369 A1* 6/2022 Kim ......................... G09G 3/20
2023/0074010 A1 3/2023 Yu

FOREIGN PATENT DOCUMENTS

TW 202207205 A 2/2022
TW 202318169 5/2023

* cited by examiner

| Line 1 | Line 2 | Line 3 | Line 4 | Line 5 | Line 6 | Line 7 | Line 8 | Line 9 | Line 10 | Line 11 |
|---|---|---|---|---|---|---|---|---|---|---|
| 653 | 696 | 740 | 783 | 827 | 870 | 914 | 957 | 1001 | 1044 | 1088 |
| -25% | -20% | -15% | -10% | -5% | 0 | 5% | 10% | 15% | 20% | 25% |

One cycle period

| Line 12 | Line 13 | Line 14 | Line 15 | Line 16 | Line 17 | Line 18 | Line 19 | Line 20 | Line 21 |
|---|---|---|---|---|---|---|---|---|---|
| 1044 | 1001 | 957 | 914 | 870 | 827 | 783 | 740 | 696 | 653 |
| 20% | 15% | 10% | 5% | 0 | -5% | -10% | -15% | -20% | -25% |

| Line 1 | Line 2 | Line 3 | Line 4 | Line 5 | Line 6 | Line 7 | Line 8 | Line 9 | Line 10 | Line 11 |
|---|---|---|---|---|---|---|---|---|---|---|
| 594 | 600 | 606 | 600 | 594 | 600 | 606 | 600 | 594 | 600 | 606 |
| -1% | 0 | 1% | 0 | -1% | 0 | 1% | 0 | -1% | 0 | 1% |

FIG. 6A

| Line 1 | Line 2 | Line 3 | Line 4 | Line 5 | Line 6 | Line 7 | Line 8 | Line 9 | Line 10 | Line 11 |
|---|---|---|---|---|---|---|---|---|---|---|
| 600 | 600 | 594 | 594 | 600 | 600 | 606 | 606 | 600 | 600 | 594 |
| 0 | 0 | -1% | -1% | 0 | 0 | 1% | 1% | 0 | 0 | -1% |

FIG. 7A

| Line 1 | Line 2 | Line 3 | Line 4 | Line 5 | Line 6 | Line 7 | Line 8 | Line 9 | Line 10 | Line 11 |
|---|---|---|---|---|---|---|---|---|---|---|
| 594 | 600 | 606 | 600 | 594 | 600 | 588 | 600 | 612 | 600 | 588 |
| -1% | 0 | 1% | 0 | -1% | 0 | -2% | 0 | 2% | 0 | -2% |

FIG. 8A

| Frame 1 | Frame 2 | Frame 3 | Frame 4 | Frame 5 | Frame 6 | Frame 7 | Frame 8 | Frame 9 | Frame 10 | Frame 11 |
|---|---|---|---|---|---|---|---|---|---|---|
| 653 | 696 | 740 | 783 | 827 | 870 | 914 | 957 | 1001 | 1044 | 1088 |
| -25.0% | -20.0% | -15.0% | -10.0% | -5.0% | | 5.0% | 10.0% | 15.0% | 20.0% | 25.0% |

1 cycle

| Frame 11 | Frame 12 | Frame 13 | Frame 14 | Frame 15 | Frame 16 | Frame 17 | Frame 18 | Frame 19 | Frame 20 | Frame 21 |
|---|---|---|---|---|---|---|---|---|---|---|
| 1088 | 1044 | 1001 | 957 | 914 | 870 | 827 | 783 | 740 | 696 | 653 |
| 25.0% | 20.0% | 15.0% | 10.0% | 5.0% | | -5.0% | -10.0% | -15.0% | -20.0% | -25.0% |

FIG. 14A

DISPLAY DEVICE AND METHOD OF TRANSMITTING SIGNALS IN DISPLAY DEVICE

CROSS REFERENCE TO RELATED APPLICATIONS

This application is a continuation-in-part of U.S. application Ser. No. 18/233,006, filed on Aug. 11, 2023, which claims the benefit of U.S. Provisional Application No. 63/408,825, filed on Sep. 21, 2022. The contents of these applications are incorporated herein by reference.

BACKGROUND OF THE INVENTION

1. Field of the Invention

The present disclosure relates to the field of signal processing, and more particularly, to a signal transmission method and apparatus, and a display device.

2. Description of the Prior Art

Nowadays, the electronic industry is developing rapidly, and various electronic products such as mobile phones, computers and game consoles have become an indispensable part of people's life. In order to meet the more abundant use requirements, the functions of electronic products are becoming more and more powerful, and their internal circuits are becoming more and more complicated. Therefore, Electro Magnetic Interference (EMI), information transmission performance improvement and other issues have also become the key consideration in electronic product research and development.

Electro Magnetic Interference refers to the influence of the circuit system on the peripheral circuit system through conduction or radiation. EMI will reduce the performance of the circuit, and it may lead to the failure of the entire device in serious cases. With the development of technology, high resolution picture and high picture update rate are inevitable trends of display devices in the future. However, with the improvement of resolution and picture update rate, the amount of data transmission becomes quite huge. In order to adapt to this trend, it is necessary to increase the frequency and energy of signals for data transmission. When the frequency and energy of signals for data transmission are increased, it will produce serious electromagnetic radiation interference effect. Therefore, how to reduce the electromagnetic radiation interference effect of electronic display device and also ensure the high-quality transmission of display picture so as to meet the increasingly abundant display requirements is an urgent problem to be solved at present.

SUMMARY OF THE INVENTION

According to an embodiment of the invention, a method of transmitting signals in a display device includes receiving a first data signal generated at a first data rate in a first time interval, and receiving a second data signal generated at a second data rate in a second time interval. The second data signal is generated at the second data rate, the second data rate is different from the first data rate, and the second time interval is non-overlapping with the first time interval.

According to another embodiment of the invention, a method of transmitting signals in a display device includes simultaneously receiving a first data signal and a first clock signal in a first time interval, the first data signal being generated at the first data rate, and, simultaneously receiving a second data signal and a second clock signal in a second time interval. The second data signal is generated at the second data rate, the second data rate is different from the first data rate, and the second time interval is non-overlapping with the first time interval.

According to another embodiment of the invention, a display device includes a controller, a data line a clock line and N source drivers coupled to the controller via the data line and the clock line, N being a positive integer exceeding 1. The N source drivers simultaneously receive a first data signal and a first clock signal in a first time interval, the first data signal being generated at the first data rate, and simultaneously receive a second data signal and a second clock signal in a second time interval. The second data signal is generated at the second data rate, the second data rate is different from the first data rate, and the second time interval is non-overlapping with the first time interval.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 6A to 6B are schematic diagrams illustrating a data rate adjusted based on a line period according to embodiments of the present disclosure;

FIGS. 7A to 7B are another schematic diagram illustrating a data rate adjusted based on a line period according to embodiments of the present disclosure;

FIGS. 8A to 8B are yet another schematic diagram illustrating a data rate adjusted based on a line period according to embodiments of the present disclosure;

FIG. 14A, FIG. 14B and FIG. 14C are schematic diagrams of the frame-based data rate cycle for use in the display device in FIG. 12A according to various embodiments of the invention;

DETAILED DESCRIPTION

Figure 1A:
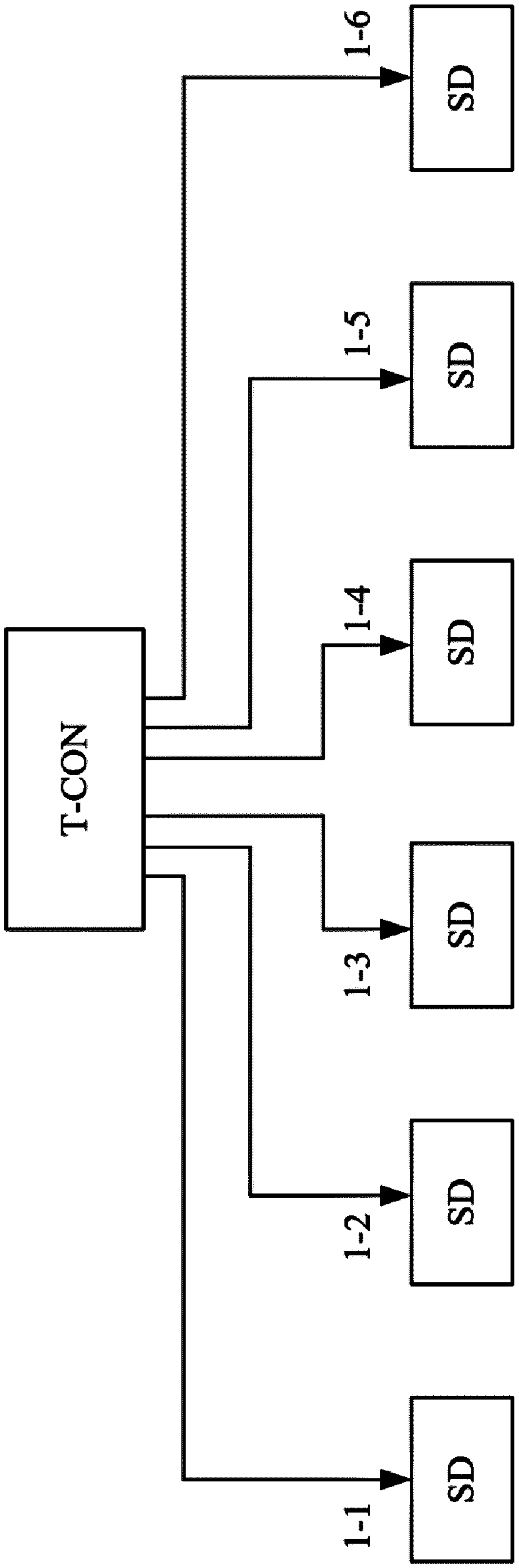
FIG. 1A is a schematic diagram illustrating a point-to-point transmission architecture according to embodiments of the present disclosure.

In order to make the objectives, technical solutions and advantages of the present application more apparent, the exemplary embodiments according to the present disclosure will be described in detail below with reference to the drawings. Obviously, the described embodiments are only a part of the embodiments of the present application, rather than all the embodiments of the present application, and it should be understood that the present application is not limited by the exemplary embodiments described herein.

Furthermore, in the specification and the drawings, steps and elements that are substantially the same or similar are denoted by the same or similar reference signs, and repeated descriptions of these steps and elements will be omitted.

Furthermore, in the specification and the drawings, elements are described in singular or plural forms according to the embodiments. However, the singular and plural forms are appropriately selected for the proposed situations only for convenience of explanation, not intended to limit the present disclosure thereto. Therefore, singular forms may include plural forms, and plural forms may also include singular forms, unless the context clearly indicates otherwise.

Furthermore, in the specification and the drawings, the involved terms "first/second" are only used to distinguish similar objects, and do not represent a specific order of objects. Understandably, "first/second" may be interchanged in a specific order or sequence when allowed, so that the embodiments of the present disclosure described here may be implemented in an order other than those illustrated or described herein.

Furthermore, in the specification and the drawings, the adopted terms such as "upper", "lower", "vertical" and "horizontal", etc. which relate to orientation or positional relationship are used only for describing the embodiments conveniently according to the present disclosure, and are not intended to limit the present disclosure thereto. Therefore, they should not be construed as a limitation to the present disclosure.

Furthermore, in the specification and the drawings, unless otherwise specified, "connection" does not necessarily mean "direct connection" or "direct contact". Here, "connection" may mean both the function of fixation and electrical communication.

In order to facilitate the description of the present disclosure, the concepts related to the present disclosure are introduced below.

Electro Magnetic Radiation widely exists in the use process of various electronic products. With the increasingly powerful functions and faster operation speed of electronic products, Electro Magnetic Interference has become a key consideration in the design of electronic products. The methods to reduce Electro Magnetic Interference mainly include: reducing the energy of electromagnetic signal transmitting end, Spread Spectrum clocking (SSC) and so on. Among them, the Spread Spectrum clocking makes the frequency of high-speed clock jitter continuously in a certain range along with time, such that the energy of electromagnetic radiation in the frequency domain is evenly distributed in a certain bandwidth frequency range, thus a peak value and an average value of electromagnetic radiation energy decrease accordingly.

FIG. 1A is a schematic diagram illustrating a point-to-point transmission architecture according to embodiments of the present disclosure. As shown in FIG. 1A, a timing controller (T-CON) is an integrated circuit chip of the display device, and is used to send display-related signals to a plurality of source drivers (SD) to drive a plurality of pixels on the display screen to display. Display-related signals include a clock signal and a data signal, where the clock signal is used to control the transmission rate of data and the data signal is used to transmit RGB (Red Green Blue) data to be displayed. For the point-to-point transmission architecture, the clock signal and the data signal share one signal transmission path. That is, in FIG. 1A, each transmission line (for example, transmission line 1-1, 1-2, 1-3, 1-4, 1-5 and 1-6 in FIG. 1A) between T-CON and SD transmits both the clock signal and the data signal. The data signal may be transmitted within the active time, and the clock signal may be transmitted within the blanking time.

At present, for a display device based on a point-to-point transmission architecture, the spread spectrum of display signal (that is, the data signal) between T-CON and SD is all taking Unit Interval (UI) as the basic unit of frequency jitter (that is, the frequency of the display signal changes in each UI, regardless of the active time and the blanking time). Although it could effectively reduce Electro Magnetic Interference, it will also increase the total jitter (TJ), which increases the difficulty of processing the display signal of the display device.

Figure 1B:
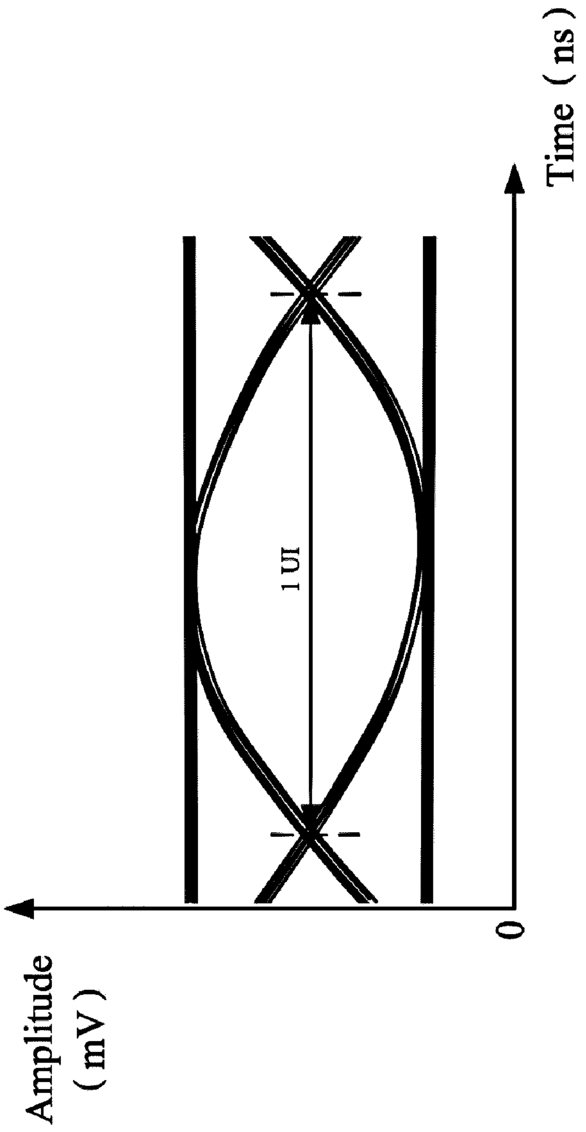
FIGS. 1B to 1C are schematic diagrams illustrating a display signal in the case of spread spectrum with a UI (Unit interval) as a basic unit of jitter according to embodiments of the present disclosure.
Figure 1C:
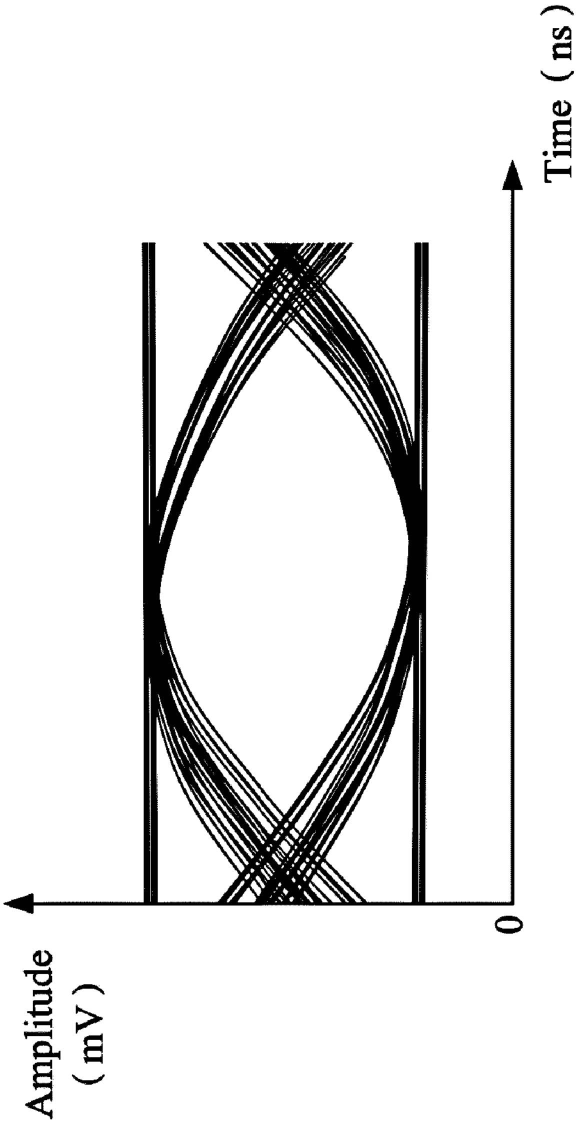

Specifically, for the spread spectrum method with UI as the basic unit for frequency jitter, the data rate for signal transmission will be constantly changed with UI as the basic unit in the whole signal transmission process. Therefore, although this method could avoid the accumulation of electromagnetic radiation energy at a fixed frequency, such that the electromagnetic radiation energy in the frequency domain is evenly distributed in a certain bandwidth frequency range, thus reducing a peak value and an average value of electromagnetic radiation energy, it would introduce more jitter to the display signal within the active time of display signal transmission. Accordingly, this spread spectrum method reduces the accuracy of the display signal and increases the processing difficulty of the display signal. Moreover, in order to avoid the situation where the frequency jitter affects the display signal too much and thus hinders the normal transmission and processing of the display signal, the amplitude of the data rate change brought by spread spectrum usually cannot exceed 3% of the transmission data rate of the display signal. Due to the small variation in data rate caused by this spread spectrum method, the waveforms in various states of the display signal (for example, it may include eight states of 000, 001, 010, 011, 100, 101, 110 and 111) could be repeatedly superimposed by an oscilloscope to form an eye diagram corresponding to the display signal. Assuming that the eye diagram corresponding to the display signal when spread spectrum is not performed is as shown in FIG. 1B, then the eye diagram corresponding to the display signal when spread spectrum is performed is as shown in FIG. 1C, where the vertical axis represents the amplitude of the display signal (unit: mV) and the horizontal axis represents the time (unit: ns) in FIG. 1B and FIG. 1C. By comparing FIG. 1B and FIG. 1C, it could be seen that the jitter of the eye diagram is greater in the case where spread spectrum is performed.

Therefore, the present disclosure provides a signal transmission method for a display device, which could effectively reduce Electro Magnetic Interference of the display device without introducing disturbance to the display signal of the display device.

As an example, the present disclosure relates to the technology for reducing Electro Magnetic Interference of the display device, and embodiments of the present disclosure will be further described below with reference to the drawings.

Generally, for a display device based on a point-to-point transmission architecture, the signal transmission period of the display device includes a blanking time and an active time.

More specifically, in the scanning process where the display device converts the electrical signal into the optical signal, for example, the scanning may start from the upper left corner of the display screen and move horizontally to the right, and when the scanning point moves to the rightmost side of the display screen, the scanning point quickly returns to the leftmost side and starts scanning the next line again. The time between the scanning point moving from the rightmost side of the N-th line to the leftmost side of the (N+1)-th line is called the horizontal blanking (H-Blank) time, where N is a positive integer. The scanning point returns to the upper left corner of the display screen after scanning of all the lines (i.e., scanning point reaches the bottom right corner of the display screen), to prepare for the next scanning (that is, the next frame). The time between the scanning point moving from the bottom right corner of the display screen to the upper left corner of the display screen is called the vertical blanking (V-Blank) time.

It could be seen that the display signal of the display device is actually transmitted only within the active time, and the blanking time is used to prepare for transmission of the display signal. Therefore, the present disclosure provides a signal transmission method for a display device, including: adjusting a data rate for signal transmission within a blanking time; and performing signal transmission within an active time by using the data rate adjusted within the blanking time. Because the adjusted data rate is used for signal transmission within the active time (that is, the data rate used for signal transmission is not adjusted within the active time), the jitter of display signal transmission could be reduced and the transmission quality of display signal could be improved.

Figure 2A:
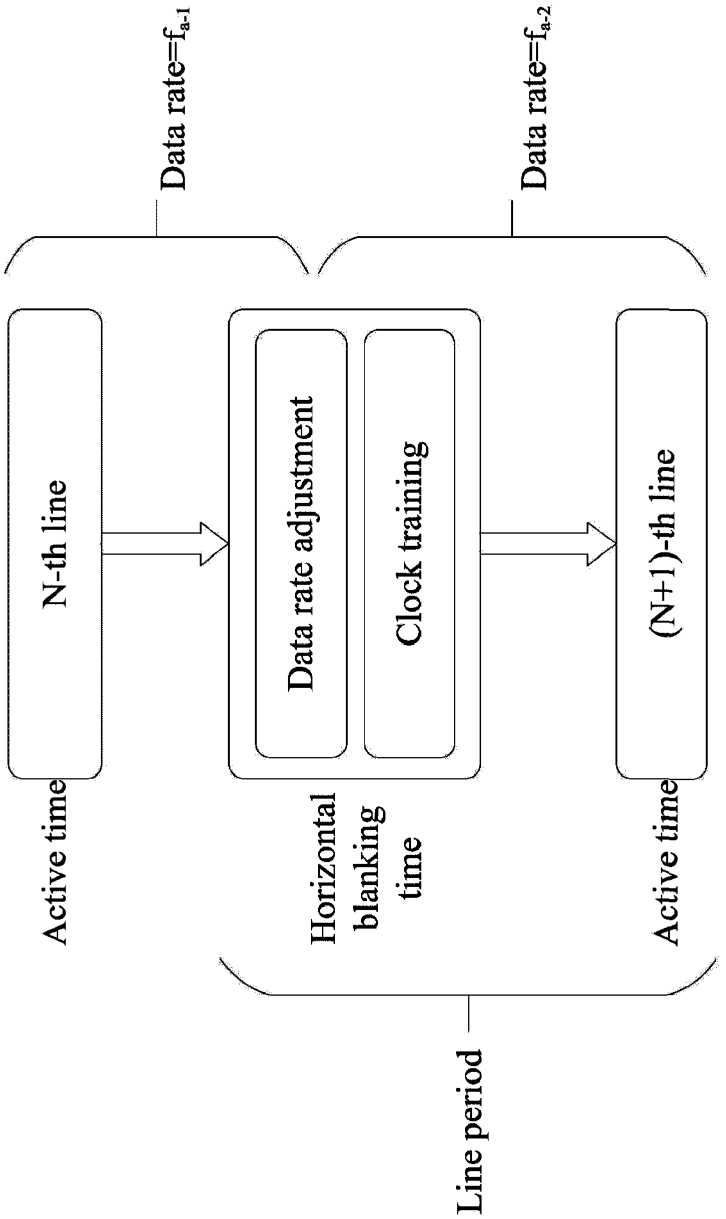
FIGS. 2A to 2B are schematic diagrams illustrating data rate variation within a signal transmission period according to embodiments of the present disclosure.

Taking a line period as the signal transmission period and a horizontal blanking time as the blanking time, FIG. 2A is a schematic diagram illustrating data rate variation within a line period according to embodiments of the present disclosure.

In FIG. 2A, the line period may include an active time and a horizontal blanking time, where the display device transmits a display signal for the line within the active time, and operations such as data rate adjustment, clock training may be performed within the horizontal blanking time. Therefore, assuming that the data rate for display signal transmission may be $f_{a-1}$ for the N-th line, then after data rate is adjusted within the horizontal blanking time, the data rate for display signal transmission may be $f_{a-2}$ for the (N+1)-th line, wherein N is a positive integer. The data rate $f_{a-2}$ may be different from the data rate $f_{a-1}$. Optionally, after the data rate for display signal transmission is adjusted within the horizontal blanking time, the adjusted data rate may be used for signal transmission within one line after the horizontal blanking time, and the adjusted data rate may also be used for signal transmission within a plurality of lines after the horizontal blanking time.

Figure 2B:
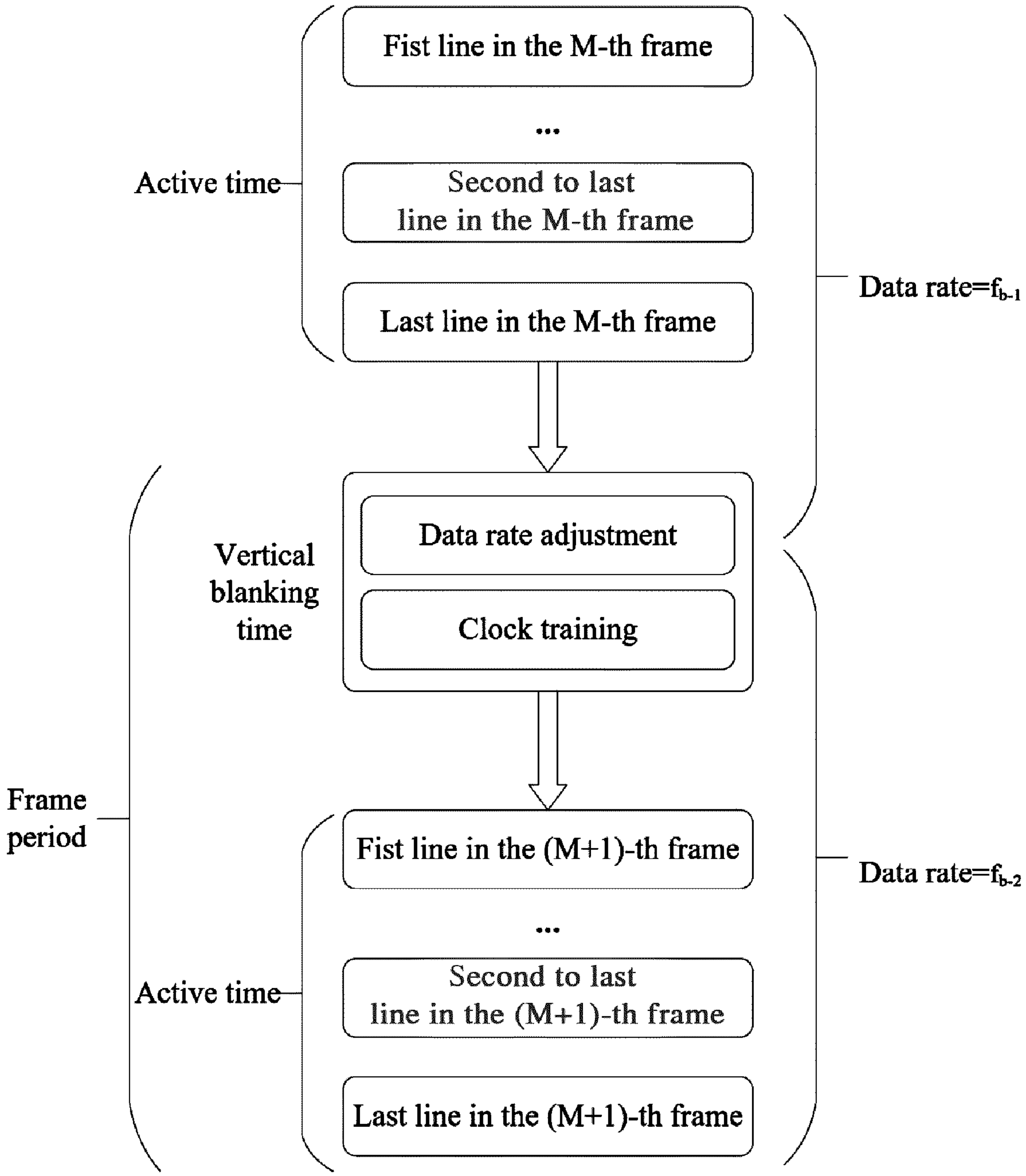

Similarly, taking a frame period as the signal transmission period and a vertical blanking time as the blanking time, FIG. 2B is a schematic diagram illustrating data rate variation within a frame period according to embodiments of the present disclosure.

In FIG. 2B, the frame period may include an active time and a vertical blanking time, where the display device transmits a display signal for a frame (including a plurality of lines), and operations such as data rate adjustment and clock training may be performed within the vertical blanking time. Therefore, assuming that the data rate for display signal transmission may be $f_{b-1}$ for the last line of the M-th frame, then after data rate is adjusted within the vertical blanking time, the data rate for display signal transmission may be $f_{b-2}$ for the first line of the (M+1)-th frame, wherein M is a positive integer. The data rate $f_{b-2}$ may be different from the data rate $f_{b-1}$. Optionally, after the data rate for display signal transmission is adjusted within the vertical blanking time, the adjusted data rate may be used for signal transmission within one frame after the vertical blanking time, and the adjusted data rate may also be used for signal transmission within a plurality of frames after the vertical blanking time.

It should be noted that the signal transmission method of the present disclosure could adjust the data rate for signal transmission only within the horizontal blanking time, could also adjust the data rate for signal transmission only within the vertical blanking time, and could also adjust the data rate for signal transmission within both the horizontal blanking time and the vertical blanking time.

Different from the spread spectrum method in which the UI is the basic unit of jitter, the signal transmission method in the embodiments shown in FIGS. 2A and 2B could adjust the data rate for signal transmission only within the blanking time and keep the data rate for signal transmission within the active time. Therefore, the change of data rate does not bring jitter to the display signal transmitted within the active time, which effectively ensures the transmission quality of the display signal. In addition, after the data rate has been adjusted for many times, the signal transmission method of the embodiment shown in FIGS. 2A and 2B could adjust the data rate for display signal transmission in a wider range, such that the energy of electromagnetic radiation in the frequency domain is evenly distributed across a wider bandwidth frequency range, thereby significantly reducing a peak value and an average value of electromagnetic radiation energy. The signal transmission method disclosed herein could be applied to any data transmission range that the receiving end capable of processing. For example, by using the signal transmission method of the present disclosure, the amplitude of the data rate change may reach 30% of the transmission data rate of the display signal.

It should be understood that for the signal transmission method for a display device of the present disclosure, the variation in data rate for signal transmission is high, thus the corresponding eye diagram cannot be obtained by repeatedly superimposing the waveforms in various states of the display signal, that is, the image shown in FIG. 1B or FIG. 1C cannot be obtained by oscilloscope analysis.

Figure 3:
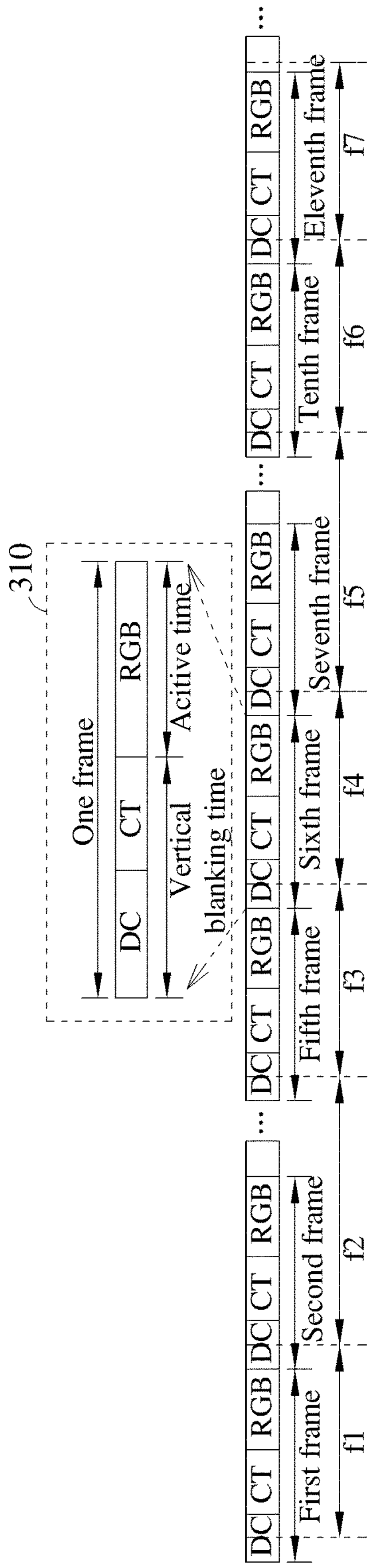
FIG. 3 is a schematic diagram illustrating a data rate adjustment process based on a frame period according to embodiments of the present disclosure.

FIG. 3 is a schematic diagram illustrating a data rate adjustment process based on a frame period according to embodiments of the present disclosure.

As shown in FIG. 3, each frame period may have a structure shown at 310, that is, each frame period may include a vertical blanking time and an active time. The vertical blanking time may include a data rate adjustment time (as shown by DC (Data rate change) in FIG. 3) and a clock training time (as shown by CT (Clock Training) in FIG. 3). A signal for display could be transmitted within the active time, the signal may include RGB (Red Green Blue) data.

For a plurality of frames, the data rate for signal transmission may be adjusted within every frame period; optionally, the frame period may be selected at a fixed interval to adjust the data rate for signal transmission (for example, the data rate for signal transmission is adjusted every two frame periods); optionally, the frame period may be randomly selected to adjust the data rate for signal transmission; optionally, the frame period may be selected in real time according to other parameters of the circuit to adjust the data rate for signal transmission.

For example, in FIG. 3, from the first frame to the second frame, the data rate for signal transmission is changed from f1 to f2; from the second frame to the fifth frame, the data rate for signal transmission is changed from f2 to f3; from the fifth frame to the sixth frame, the data rate for signal transmission is changed from f3 to f4; from the sixth frame to the seventh frame, the data rate for signal transmission is changed from f4 to f5; from the seventh frame to the tenth frame, the data rate for signal transmission is changed from f5 to f6; and from the tenth frame to the eleventh frame, the data rate for signal transmission is changed from f6 to f7.

According to the embodiment of the present disclosure, for a plurality of frame periods, the data rate for signal transmission may also be adjusted periodically. For example, the data rate for signal transmission may be adjusted with a first number of frame periods as an adjustment cycle period, such that the data rate changes periodically within the adjustment cycle period, and a second number of frame periods is taken as a maintaining time, and signal transmission is performed at the same data rate within the maintaining time, where the first number and the second number are integers, and the first number is greater than the second number.

For example, the data rate for signal transmission may be adjusted with 11 frame periods (that is, the first number of frame periods) as the adjustment cycle period, such that the data rate changes periodically within the adjustment cycle period, and one or more (for example, 2, 3, 5, etc.) frame periods (that is, the second number of frame periods) may be taken as the maintaining time, and signal transmission is performed at the same data rate within the maintaining time, where the number of frame periods within the maintaining time is less than 11.

For another example, 24 frame periods (that is, the first number of frame periods) are taken as the adjustment cycle period, the data rate is adjusted once every 4 frame periods, that is, the maintaining time of each data rate is 4 frame periods (that is, the second number of frame periods). Specifically, the data rate of the first to fourth frame periods is f1, the data rate of the fifth to eighth frame periods is f2, the data rate of the ninth to twelfth frame periods is f3, the data rate of the thirteenth to sixteenth frame periods is f4, the data rate of the seventeenth to twentieth frames is f3, the data rate of the twenty-first to twenty-fourth frames is f2, and the data rate of the twenty-fifth to twenty-eighth frames becomes f1 again.

Optionally, for the frame period in which the data rate for signal transmission needs to be adjusted, the adjusted data rate may be determined based on a current data rate according to a predetermined adjustment rule (for example, monotonically increasing or decreasing a certain proportion). For example, the data rate may monotonically increase with a first step size in a first part of an adjustment cycle period and monotonically decrease with a second step size in a second part of the adjustment cycle period, the first step size may be the same as or different from the second step size.

In addition, for the frame period in which the data rate for signal transmission needs to be adjusted, the adjusted data rate may also be randomly determined.

It should be understood that, similar to the embodiment shown in FIG. 3, for a plurality of lines, it may also be determined that the data rate for signal transmission is adjusted within every line period; optionally, line period may be selected at a fixed interval to adjust the data rate for signal transmission (for example, the data rate for signal transmission is adjusted every two line periods); optionally, the line period may be randomly selected to adjust the data rate for signal transmission; optionally, the line period may be selected according to other parameters of the circuit to adjust the data rate for signal transmission.

In addition, for a plurality of line periods, the data rate for signal transmission may also be adjusted periodically. For example, the data rate for signal transmission may be adjusted with a third number of line periods as an adjustment cycle period, such that the data rate changes periodically within the adjustment cycle period, and a fourth number of line periods is taken as a maintaining time, and signal transmission is performed at the same data rate within the maintaining time, where the third number and the fourth number are integers, and the third number is greater than the fourth number.

Optionally, for the line period in which the data rate for signal transmission needs to be adjusted, the adjusted data rate may be determined based on a current data rate according to a predetermined adjustment rule (for example, monotonically increasing or decreasing by a certain proportion). For example, the data rate may monotonically increase with a first step size in a first part of an adjustment cycle period and monotonically decrease with a second step size in a second part of the adjustment cycle period, the first step size may be the same as or different from the second step size.

For example, 20 line periods (that is, the third number of line periods) may be used as the adjustment cycle period, and the data rate may be adjusted once every 5 line periods (that is, the fourth number of line periods), that is, the maintaining time of each data rate is 5 line periods. Specifically, the data rate of the first to fifth line periods is f1, the data rate of the sixth to tenth line periods is f2, and the data rate of the eleventh to fifteenth line periods is f3, the data rate of the sixteenth to twentieth line periods is f2, and then the data rate of the twenty-first to twenty-fifth frame periods becomes f1 again.

In addition, the adjusted data rate may also be determined randomly for the line period where the data rate for signal transmission needs to be adjusted.

According to the embodiment of the present disclosure, the time length of the frame period and/or the line period may be fixed. The length of the line active time is associated with the adjusted data rate. The length of the horizontal blanking time may be determined by the line period and the length of the active time. For example, horizontal blanking time=line period−line active time.

Figure 4A:
FIGS. 4A to 4B are schematic diagrams illustrating a data rate adjusted based on a line period according to embodiments of the present disclosure.

FIG. 4A is a schematic diagram illustrating a data rate adjusted based on a line period according to embodiments of the present disclosure.

In the example of FIG. 4A, the data rate for signal transmission is adjusted with 20 line periods (that is, the third number of line periods) as the adjustment cycle period and 1 line period (that is, the fourth number of line periods) as the maintaining time. Assuming that 870 Mbps is taken as a reference data rate, the data rate within the active time of the first line may be 653 Mbps (that is, 25% lower than the reference data rate 870 Mbps); the data rate within the active time of the second line may be 696 Mbps (that is, 20% lower than the reference data rate 870 Mbps); the data rate within the active time of the third line may be 740 Mbps (that is, 15% lower than the reference data rate 870 Mbps) . . . the data rate within the active time of the twentieth line may be 696 Mbps (that is, 20% lower than the reference data rate 870 Mbps); the data rate within the active time of the twenty-first line may be 653 Mbps (that is, 25% lower than the reference data rate 870 Mbps). It should be understood that the reference data rate could be the rated data rate for signal transmission, but it is not limited to this.

Figure 4B:
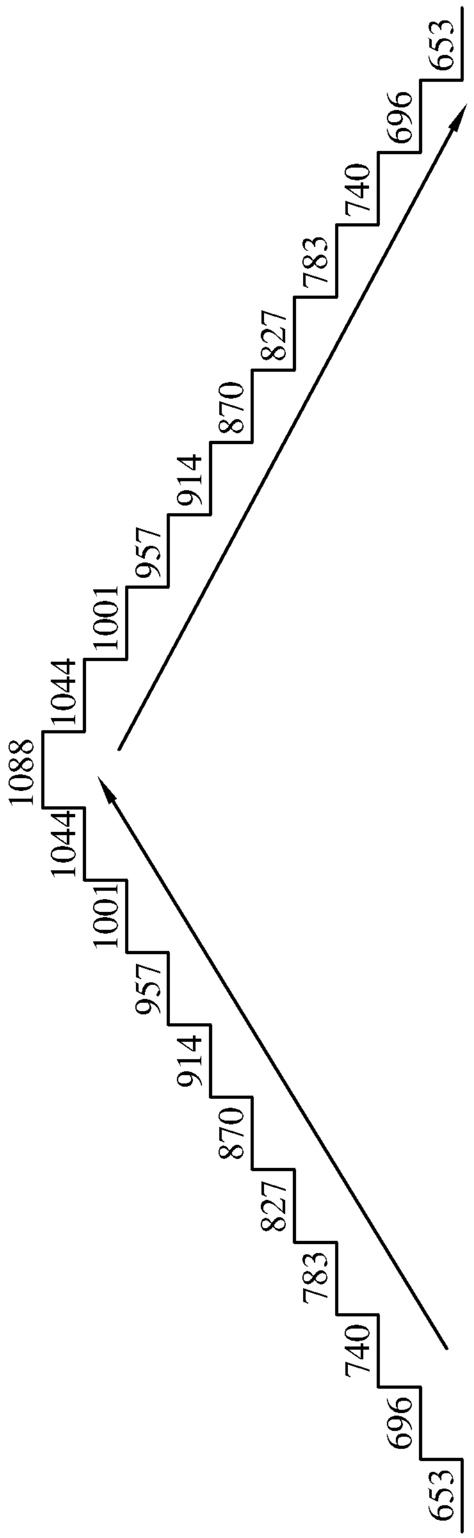

For the example shown in FIG. 4A, the data rate of each line period within the adjustment cycle period is shown in FIG. 4B. That is, the data rate monotonically increases in the first to eleventh lines of the adjustment cycle period and monotonically decreases in the twelfth to twenty-first lines of the adjustment cycle period. Wherein, the adjustment range of the data rate is ±25% within the data transmission range that the receiving end for signal transmission could process.

Figure 5:
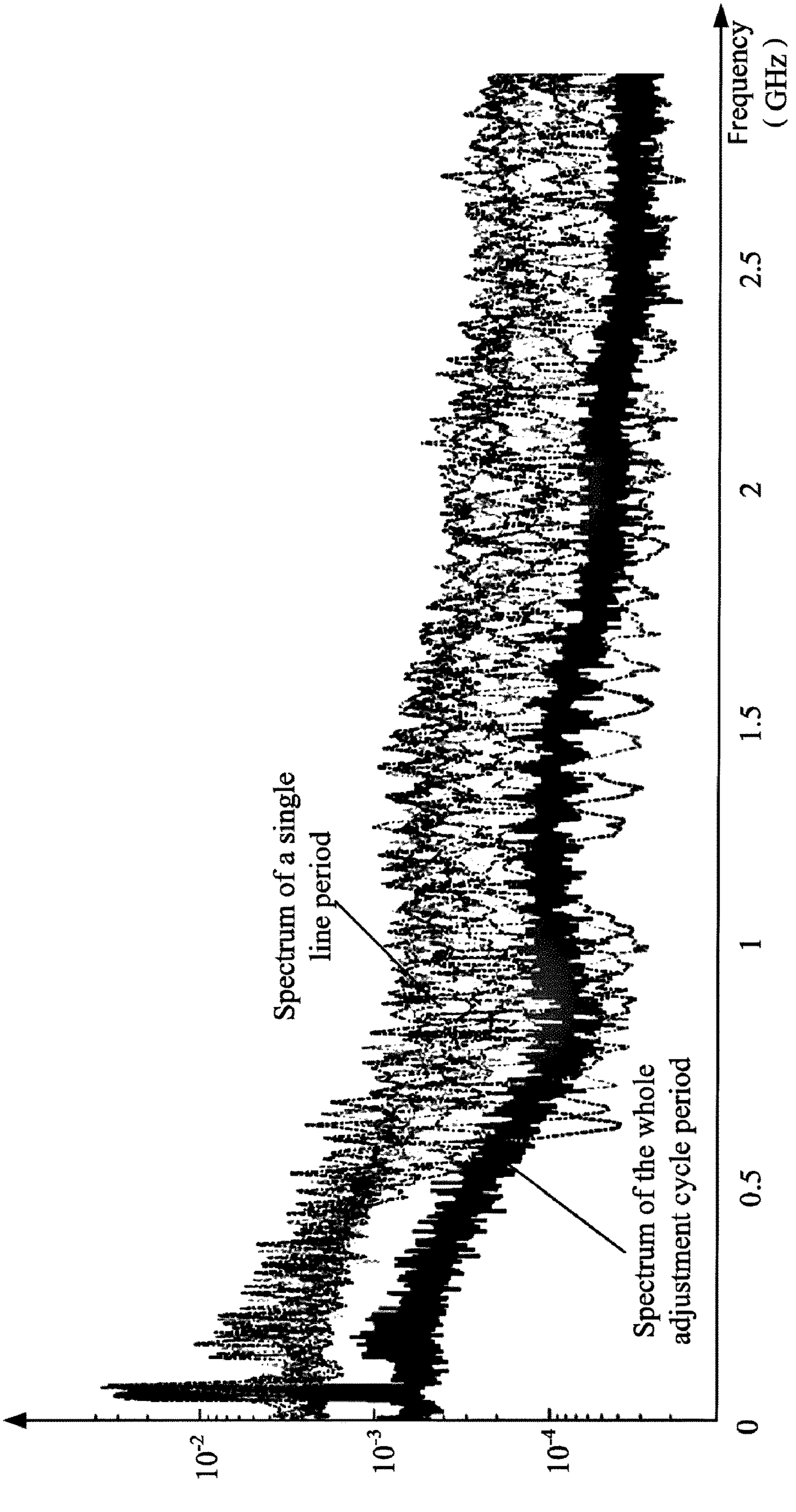
FIG. 5 is a schematic diagram illustrating a signal frequency spectrum for the embodiment illustrated in FIGS. 4A to 4B.

FIG. 5 is a schematic diagram illustrating a signal spectrum for the embodiment shown in FIGS. 4A to 4B.

As shown in FIG. 5, for the first to twenty-first lines (data rate changes between 653 Mbps to 1088 Mbps) in the embodiment shown in FIGS. 4A to 4B, the spectrum of a single line period is shown in the curves at the upper part in FIG. 5. The spectrum of the whole adjustment cycle period obtained by synthesizing results of the spectrum of respective line periods is shown in the gray thick curves at the lower part in FIG. 5. Thus, through the signal transmission method of the present disclosure, the electromagnetic radiation energy is significantly reduced compared to using single data rate for signal transmission.

FIG. 6A is a schematic diagram illustrating a data rate adjusted based on a line period according to embodiments of the present disclosure.

In the example of FIG. 6A, the data rate for signal transmission is adjusted with 4 line periods as the adjustment cycle period and 1 line period as the maintaining time. Assuming that 600 Mbps is taken as the reference data rate, the data rate within the active time of the first line may be 594 Mbps (that is, 1% lower than the reference data rate 600 Mbps); the data rate within the active time of the second line may be 600 Mbps; the data rate within the active time of the third line may be 606 Mbps (that is, 1% higher than the reference data rate 600 Mbps); the data rate within the active time of the fourth line may be 600 Mbps, so the first to fourth lines may be regarded as one adjustment cycle period. By analogy, the fifth to eighth lines, the ninth to twelfth line, . . . , (4n−3)-th to the 4n-th lines may form adjustment cycle periods respectively, where n is an integer greater than or equal to 1.

Figure 6B:
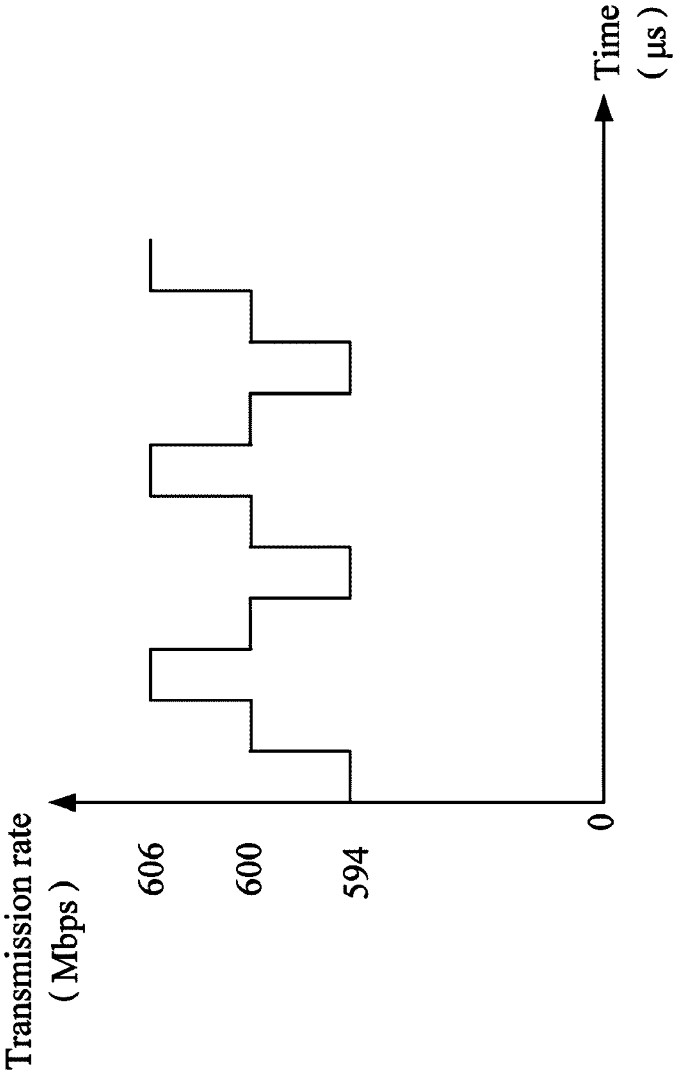

For the example shown in FIG. 6A, the change of data rate within respective line periods is shown in FIG. 6B, where the vertical axis represents data rate (unit: Mbps) and the horizontal axis represents time (unit: μs) in FIG. 6B. That is, the data rate takes 4 line periods as the adjustment cycle period and 1 line period as the maintaining time, and changes regularly around the reference data rate based on the reference data rate 600 Mbps.

Similarly, according to the embodiment of the present disclosure, the data rate may also be adjusted based on the frame period as shown in FIGS. 6A and 6B.

FIG. 7A is another schematic diagram illustrating a data rate adjusted based on a line period according to embodiments of the present disclosure.

In the example of FIG. 7A, the data rate for signal transmission is adjusted with 8 line periods as the adjustment cycle period and 2 line periods as the maintaining time. Assuming that 600 Mbps is taken as the reference data rate, the data rate within the active time of the first line and the second line may be 600 Mbps; the data rate within the active time of the third line and the fourth line may be 594 Mbps (that is, 1% lower than the reference data rate 600 Mbps); the data rate within the active time of the fifth line and the sixth line may be 600 Mbps; the data rate within the active time of the seventh line and the eighth line may be 606 Mbps (that is, 1% higher than the reference data rate 600 Mbps), so the first to eighth lines may be regarded as an adjustment cycle. By analogy, the ninth to sixteenth lines, the seventeenth to twenty-fourth lines . . . , (8n−7)-th to 8n-th lines may form adjustment cycle periods respectively, where n is an integer greater than or equal to 1.

Figure 7B:
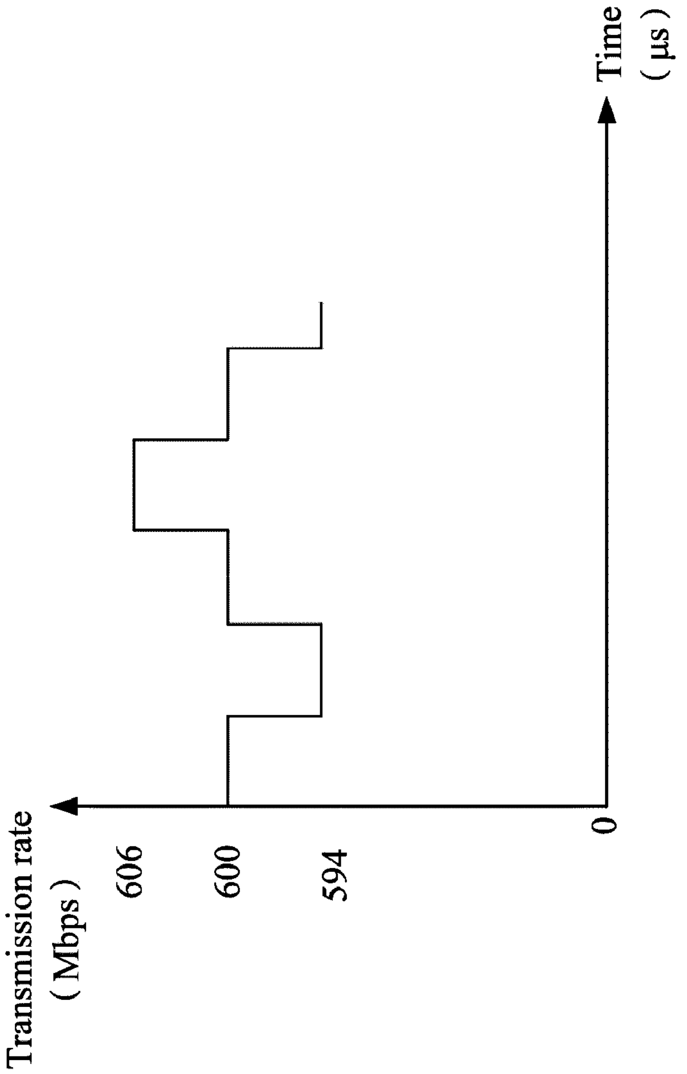

For the example shown in FIG. 7A, the change of data rate within respective line periods is shown in FIG. 7B, where the vertical axis represents data rate (unit: Mbps) and the horizontal axis represents time (unit: μs) in FIG. 7B. That is, the data rate takes 8 line periods as the adjustment cycle period and 2 line periods as the maintaining time, and changes regularly around the reference data rate based on the reference data rate 600 Mbps.

Similarly, according to the embodiment of the present disclosure, the data rate may also be adjusted based on the frame period as shown in FIGS. 7A and 7B.

FIG. 8A is yet another schematic diagram illustrating a data rate adjusted based on a line period according to embodiments of the present disclosure.

In the example of FIG. 8A, the data rate for signal transmission is randomly adjusted. Assuming that 600 Mbps is taken as the reference data rate, the data rate within the active time of the first line may be 594 Mbps (that is, 1% lower than the reference data rate 600 Mbps); the data rate within the active time of the second line may be 600 Mbps; the data rate within the active time of the third line may be 606 Mbps (that is, 1% higher than the reference data rate 600 Mbps) . . . the data rate within the active time of the eleventh line may be 588 Mbps (that is, 2% lower than the reference data rate 600 Mbps), so the data rates of respective lines may not have a periodic cyclic pattern.

Figure 8B:
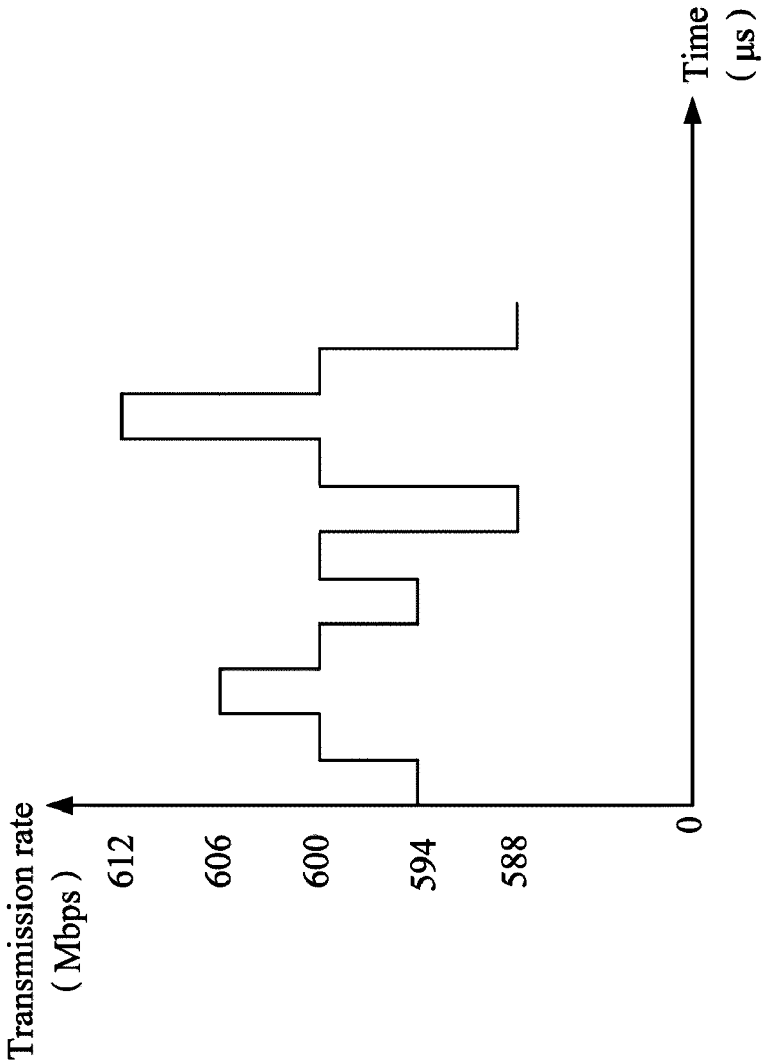

For the example shown in FIG. 8A, the change of data rate within respective line periods is shown in FIG. 8B, where the vertical axis represents the data rate (unit: Mbps) and the horizontal axis represents the time (unit: μs) in FIG. 8B. That is, the data rate changes randomly, wherein the adjustment range of the data rate is within the data transmission range that the receiving end for signal transmission could process. For example, a maximum data rate should be lower than a maximum allowable data rate of the receiving end for signal transmission, and a minimum data rate should ensure that the data transmission of the corresponding line could be completed within the active time of the line period.

Similarly, according to the embodiment of the present disclosure, the data rate may also be adjusted based on the frame period as shown in FIGS. 8A and 8B.

For the signal transmission method of the present disclosure, both the data rate within the line period and the data rate within the frame period could be changed randomly.

For example, assuming that the data rate within the active time of the N-th line is f, the data rate within the active time of the (N−a)-th line may be f±c %, and the data rate within the active time of the (N+b)-th line may be f±d %, where a, b are the number of lines differ from the N-th line, c, d are the variation amplitude of the data rate, and further, a, b may be the same or different values, c, d may be the same or different values.

For another example, assuming that the data rate within the active time of the M-th frame is f the data rate within the active time of the (M−x)-th frame may be f±w %, and the data rate within the active time of the (M+y)-th frame may be f±z %, where x, y are the number of frames different from the M-th frame, w, z are the variation amplitude of the data rate, and further, x, y may be the same or different values, w, z may be the same or different values.

By randomly changing the data rate within the data transmission range that the receiving end could process, the signal transmission method of the present disclosure could be used in more abundant application scenarios, to meet more abundant data rate change requirements.

Figure 9:
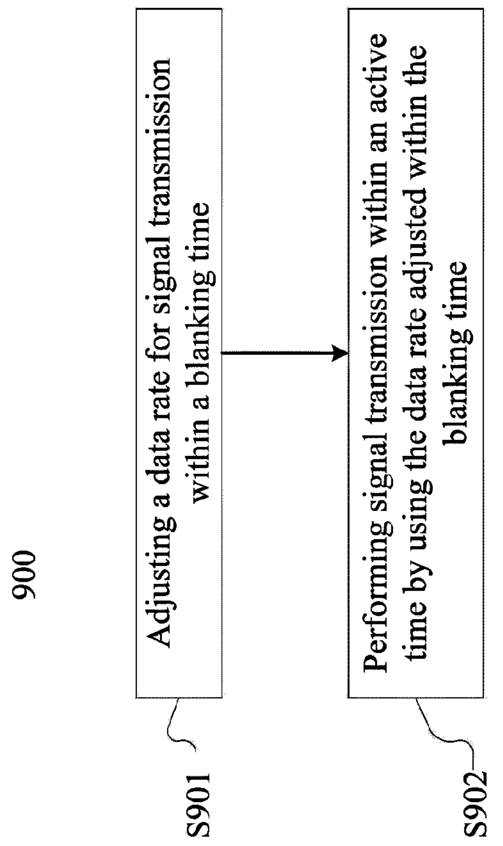
FIG. 9 is a schematic flowchart illustrating a signal transmission method for a display device according to embodiments of the present disclosure.

FIG. 9 is a schematic flowchart 900 illustrating a signal transmission method for a display device according to embodiments of the present disclosure.

In step S901, a data rate for signal transmission is adjusted within a blanking time; in step S902, signal transmission is performed within an active time by using the data rate adjusted within the blanking time, where a signal transmission period of the display device may include the blanking time and the active time.

According to embodiments of the present disclosure, the signal transmission period may be a frame period, the blanking time may be a vertical blanking time, and the data rate for signal transmission may be adjusted within the vertical blanking time, where the adjusted data rate is used for performing signal transmission within at least one frame after the vertical blanking time or used for performing signal transmission within at least one line after the vertical blanking time.

Optionally, a first number of frame periods may be taken as an adjustment cycle period, the data rate used for signal transmission is adjusted, such that the data rate changes periodically within the adjustment cycle period, a second number of frame periods is taken as a maintaining time, and signal transmission is performed at the same data rate within the maintaining time, where the first number and the second number are integers, and the first number is greater than the second number.

According to embodiments of the present disclosure, the signal transmission period may be a line period, the blanking time may be a horizontal blanking time, and the data rate for signal transmission may be adjusted within the horizontal blanking time, where the adjusted data rate is used for performing signal transmission within at least one line after the horizontal blanking time.

Optionally, a third number of line periods may be taken as an adjustment cycle period, the data rate used for signal transmission is adjusted, such that the data rate changes periodically within the adjustment cycle period, a fourth number of line periods is taken as a maintaining time, and signal transmission is performed at the same data rate within the maintaining time, where the third number and the fourth number are integers, and the third number is greater than the fourth number.

The line period may have a preset time length, and a length of the active time is associated with the adjusted data rate; and a length of the horizontal blanking time is determined by the line period and the length of the active time.

According to the embodiment of the present disclosure, an amount of data rate change within the adjustment cycle period is less than or equal to a first threshold, and an amount of data rate change between two adjacent data rates is less than or equal to a second threshold, wherein the first threshold is greater than or equal to the second threshold. For example, the first threshold may be 25% of a reference data rate, and the second threshold may be 5% of the reference data rate. The first threshold and the second threshold may be determined according to the actual demand or the performance of the display device hardware. According to the embodiment of the present disclosure, the first threshold and the second threshold may be determined by a maximum allowable data rate and a minimum allowable data rate of the display device hardware, where the maximum allowable data rate is determined by the data receiving/processing capability of the receiving end for signal transmission, and the minimum allowable data rate is determined by the length of the active time and the amount of data to be transmitted.

According to embodiments of the present disclosure, the data rate may monotonically increase in a first part of the adjustment cycle period and monotonically decrease in a second part of the adjustment cycle period, where the data rate is lower than a maximum allowable data rate at a receiving end for signal transmission.

In addition, both the moment for adjusting signal transmission and the data rate for signal transmission may be determined in a random manner. That is, for a plurality of consecutive signal transmission periods of the display device, at least one signal transmission period for adjusting the data rate for signal transmission may be randomly determined. And for each signal transmission period of the display device, it may be further randomly determined whether to adjust the data rate for signal transmission. It should be understood that the signal transmission period herein may be either a frame period or a line period.

For each signal transmission period of the display device, when it is determined that the data rate for signal transmission needs to be adjusted, the adjusted data rate is determined based on a current data rate according to a predetermined adjustment rule (for example, the adjusted data rate may be determined by multiplying the current data rate by a certain proportional coefficient, and the adjusted data rate may be determined by increasing or decreasing the current data rate by a certain value, etc.); or the adjusted data rate is randomly determined.

Figure 10:
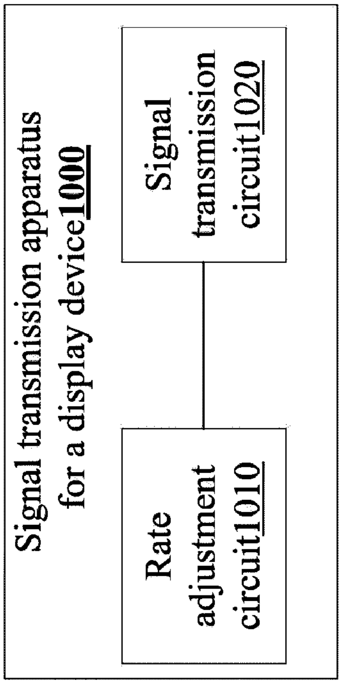
FIG. 10 is a schematic diagram illustrating the composition of a signal transmission apparatus for a display device according to embodiments of the present disclosure.

FIG. 10 is a schematic diagram illustrating the composition of a signal transmission apparatus 1000 for a display device according to embodiments of the present disclosure.

As shown in FIG. 10, a signal transmission apparatus 1000 for a display device may include a rate adjustment circuit 1010 configured to adjust a data rate for signal transmission within a blanking time; a signal transmission circuit 1020 configured to perform signal transmission within an active time by using the data rate adjusted within the blanking time; where the signal transmission period of the display device includes the blanking time and the active time. The rate adjustment circuit 1010 and the signal transmission circuit 1020 are electrically connected.

Optionally, the signal transmission period may be a frame period, and the blanking time may be a vertical blanking time. In this case, the rate adjustment circuit 1010 may be further configured to adjust the data rate for signal transmission within the vertical blanking time, where the adjusted data rate is used for performing signal transmission within at least one consecutive frame after the vertical blanking time or used for performing signal transmission within at least one consecutive line after the vertical blanking time.

Optionally, the signal transmission period may be a line period, and the blanking time may be a horizontal blanking time. In this case, the rate adjustment circuit 1010 may be further configured to adjust the data rate for signal transmission within the horizontal blanking time, where the adjusted data rate is used for performing signal transmission within at least one consecutive line after the horizontal blanking time.

According to the embodiment of the present disclosure, the rate adjustment circuit 1010 could either adjust the data rate for signal transmission periodically or adjust the data rate for signal transmission randomly.

For example, in the case where the rate adjustment circuit 1010 adjusts the data rate for signal transmission periodically, the data rate may monotonically increase in a first part of an adjustment cycle and monotonically decrease in a second part of the adjustment cycle, where the data rate is lower than a maximum allowable data rate of the receiving end for signal transmission. Optionally, the data rate may monotonically increases at a first step size, and monotonically decreases at a second step size, where the first step size is the same as or different from the second step size.

In the case where the rate adjustment circuit 1010 adjusts the data rate for signal transmission randomly, the rate adjustment circuit 1010 may be further configured to, for a plurality of consecutive signal transmission periods of the display device, randomly determine at least one signal transmission period for adjusting the data rate for signal transmission. In addition, the rate adjustment circuit 1010 may also be configured to, for each signal transmission period of the display device, randomly determine whether to adjust the data rate for signal transmission. Optionally, for each signal transmission period of the display device, when it is determined that the data rate for signal transmission needs to be adjusted, the adjusted data rate may be determined based on a current data rate according to a predetermined adjustment rule; or the adjusted data rate may be determined randomly.

Embodiments of the present disclosure further provide a display device, which may include the signal transmission apparatus in any of the embodiments described above, and transmit a display signal by the signal transmission method in any of the embodiments described above. Optionally, the display device of the present disclosure may include various devices including a display screen, such as mobile phones, computers, game consoles, projectors, etc. The display device of the present disclosure may be based on a point-to-point transmission architecture.

Therefore, the present disclosure provides a signal transmission method and apparatus for a display device, and a display device.

According to the embodiment of the present disclosure, the signal transmission method for a display device comprising: adjusting a data rate for signal transmission within a blanking time; and performing signal transmission within an active time by using the data rate adjusted within the blanking time; where a signal transmission period of the display device includes the blanking time and the active time.

Since the present disclosure adjusts the data rate for signal transmission within the blanking time and performs signal transmission within the active time by using the data rate adjusted within the blanking time, it not only reduces the Electro Magnetic Interference during signal transmission, but also prevents frequency variations from affecting the quality of the picture displayed by the display device, thus improving the overall performance of the display device. Furthermore, since the data rate used for signal transmission is adjusted within the blanking time, it is possible to significantly expand the range of data rate used for signal transmission, so as to meet more abundant data rate transmission requirements. This also allows for a more even distribution of electromagnetic radiation energy across a wider bandwidth frequency range, further enhancing the effectiveness of reducing electromagnetic interference during signal transmission.

It should be noted that, although the above embodiments of the present disclosure mainly take the display device based on a point-to-point transmission architecture as an example, the data rate adjustment manner of the present disclosure may also be applied to the display device with a Multi-drop transmission architecture (for example, the Mini-LVDS (Low Voltage Differential Signaling) transmission architecture). That is, in the case of a display device with the Mini-LVDS transmission architecture, the data rate for signal transmission may also be adjusted in order to expand the range of data rate for signal transmission, such that the energy of electromagnetic radiation could be evenly distributed across a wider bandwidth frequency range, thus reducing Electro Magnetic Interference during signal transmission.

Figure 11:
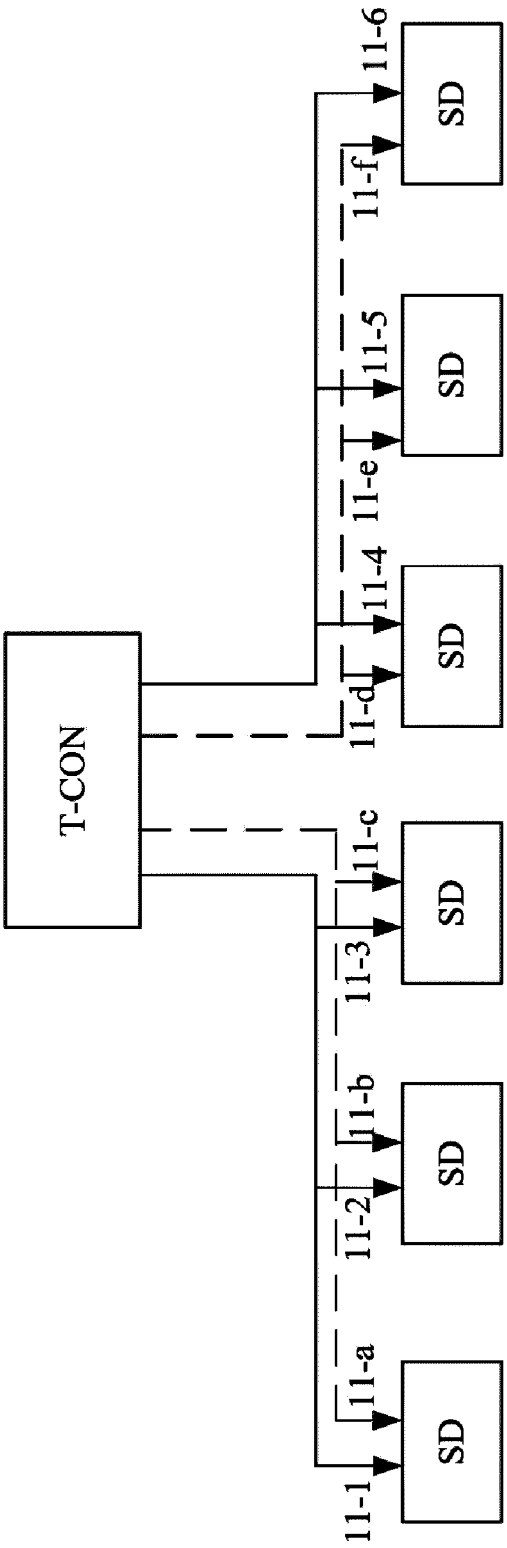
FIG. 11 is a schematic diagram illustrating a mini low voltage differential signal (Mini-LVDS) transmission architecture according to embodiments of the present disclosure.

FIG. 11 is a schematic diagram illustrating a Mini-LVDS transmission architecture according to embodiments of the present disclosure. The timing controller (T-CON) is connected with a plurality of source drivers (SD) to drive a plurality of pixels on the display screen to display. Different from the point-to-point transmission architecture shown in FIG. 1A, for the Mini-LVDS transmission architecture, the clock signal and the data signal have their own separate transmission paths. For example, clock signals are transmitted on transmission lines 11-1, 11-2, 11-3, 11-4, 11-5 and 11-6 shown by solid lines in FIG. 11, and data signals are transmitted on transmission lines 11-*a*, 11-*b*, 11-*c*, 11-*d*, 11-*e* and 11-*f* shown by dashed lines in FIG. 11.

For the Mini-LVDS transmission architecture, since the data signal and the clock signal are transmitted independently, there is no need to distinguish the active time and the blanking time for transmission, as long as the data signal and the clock signal are synchronously adjusted.

Therefore, under the Mini-LVDS transmission architecture, it is not necessary to adjust the data rate for signal transmission within the blanking time as that in the point-to-point architecture, and it could be still ensured that the variation of data rate will not affect the quality of the picture displayed by the display device. Optionally, the data rate for signal transmission may be adjusted by the following manners and any combinations thereof: adjusting the data rate for signal transmission in units of a frame period, adjusting the data rate for signal transmission in units of a line period, and adjusting the data rate for signal transmission in units of a unit interval (UI). In addition, the data rate for signal transmission may also be adjusted within a frame and/or within a line. Under the Mini-LVDS transmission architecture, by controlling the specifications of the respective eye diagrams (similar to that shown in FIG. 1B) of the clock signal and the data signal using the various data rate adjustment methods described above, the transmission quality of the data signal and the clock signal could be ensured without generating the big jitter shown in FIG. 1C.

The present disclosure uses specific words to describe the embodiments of the present disclosure. Examples such as "first/second embodiment", "one embodiment" and/or "some embodiments" refer to a certain feature, structure or characteristic related to at least one embodiment of the present disclosure. Therefore, it should be emphasized and noted that "an embodiment" or "one embodiment" or "an alternative embodiment" mentioned twice or more in different places in this specification do not necessarily mean the same embodiment. In addition, some features, structures, or characteristics in one or more embodiments of the present disclosure may be appropriately combined.

Unless otherwise defined, all terms (including technical and scientific terms) used herein have the same meaning as commonly understood by those of ordinary skill in the art to which this disclosure belongs. It will be further understood that terms, such as those defined in commonly used dictionaries, should be interpreted as having the meaning that is consistent with their meaning in the context of the relevant art and will not be interpreted in an idealized or overly formal sense unless explicitly defined herein.

Figure 12A:
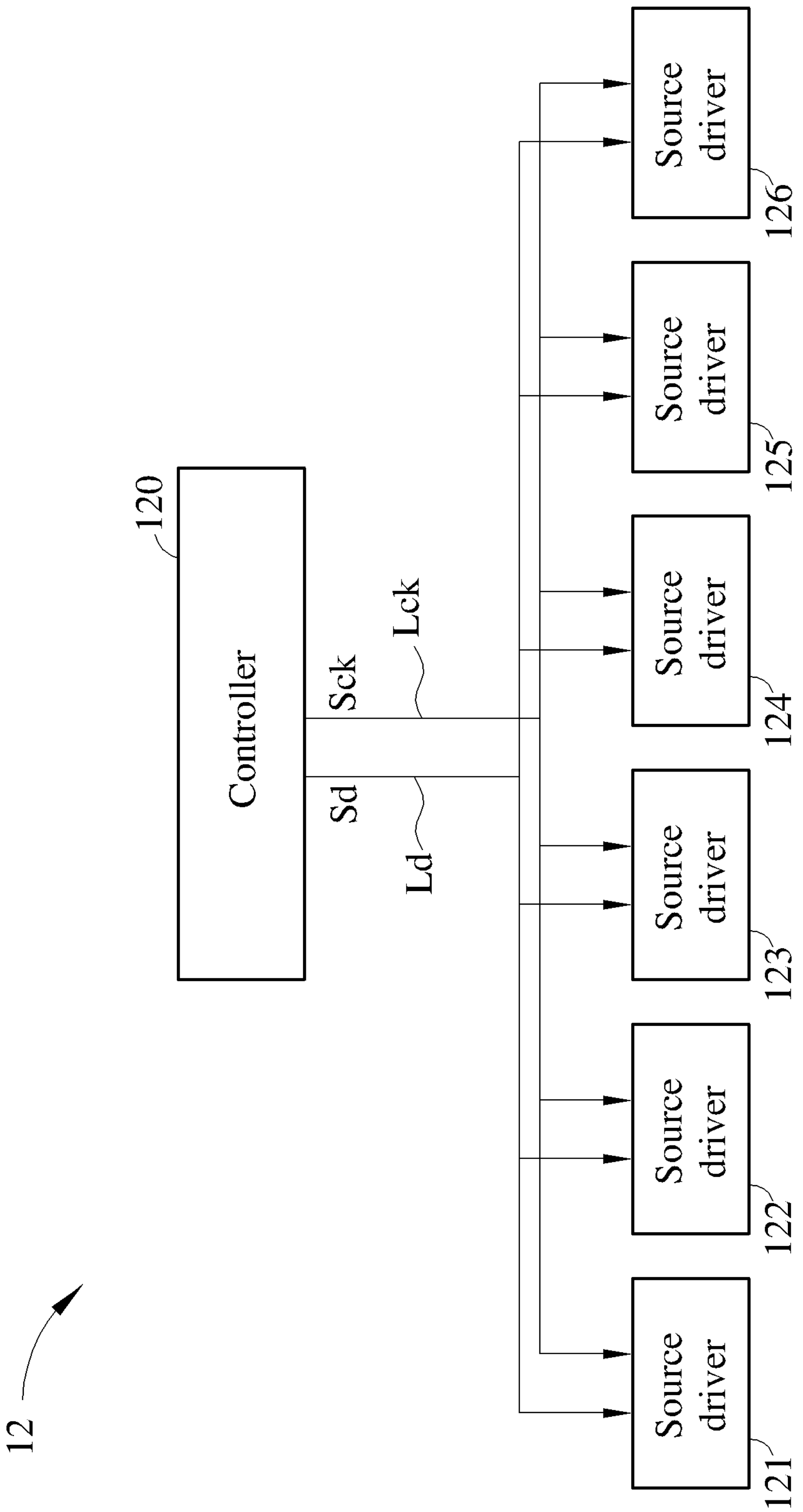
FIG. 12A is a schematic diagram of a Mini-LVDS architecture in a display device according to another embodiment of the disclosure.

FIG. 12A is a schematic diagram of a display device 12 utilizing a mini-LVDS architecture according to another embodiment of the disclosure. The display device 12 includes a controller 120, a data line Ld, a clock line Lck and source drivers 121 to 126. The mini-LVDS architecture is used in a multidrop application in which the controller 120 is coupled to the source drivers 121 to 126 via the data line Ld and the clock line Lck. The controller 120 may be a timing controller simultaneously transmitting a data signal Sd to the source drivers 121 to 126 via the data line Ld and transmitting a clock signal Sck to the source drivers 121 to 126 via the clock line Lck. Therefore, the source drivers 121 to 126 may sample the data signal Sd using the clock signal Sck without clock training. Since no clock training is required for the mini-LVDS architecture, the controller 120 may vary the data rate at which the data signal Sd is generated and the clock rate at which the clock signal Sck is generated at any time. In some embodiments, the controller 120 may vary the data rate of the data signal Sd and the clock rate of the clock signal Sck at active video intervals of video frames. In other embodiments, the controller 120 may vary the data rate of the data signal Sd and the clock rate of the clock signal Sck at vertical blanking intervals of video frames. In yet other embodiments, the controller 120 may vary the data rate of the data signal Sd and the clock rate of the clock signal Sck at horizontal blanking intervals of video frames.

The data signal Sd and the clock signal Sck may be transmitted by differential signaling, and the data line Ld and the clock line Lck may be differential pairs of transmitting the data signal Sd and the clock signal Sck, respectively. The data signal Sd may carry pixel data. The source drivers 121 to 126 may be further coupled to a display panel including a plurality of columns of pixels, and each of the source drivers 121 to 126 may be coupled to predetermined columns of pixels. For example, the display panel may have a full high definition (FHD) resolution including 1920 columns of pixels, each column of pixels including 1080 lines. The source driver 121 may be coupled to the first to $320^{th}$ columns of pixels, the source driver 122 may be coupled to the $321^{st}$ to $640^{th}$ columns of pixels, . . . , and the source driver 126 may be coupled to the $1601^{st}$ to $1920^{th}$ columns of pixels, so as to drive the pixel data to the 1920 columns of pixels. The source driver 121 may sample and drive the pixel data to the first to $320^{th}$ columns of pixels in a first duration, the source driver 122 may sample and drive the pixel data to the $321^{st}$ to $640^{th}$ columns of pixels in a second duration, . . . , and the source driver 126 may sample and drive the pixel data to the $1601^{st}$ to $1920^{th}$ columns of pixels in a sixth duration, the first duration to the sixth duration being adjacent in sequence.

The data rate may match the clock rate. In some embodiments, the data rate may be equal to the clock rate. For example, if the data rate is 600 megahertz (MHz), the clock rate will be 600 megahertz (MHz). Since the data signal Sd and the clock signal Sck are generated at varying identical rates, the electromagnetic interference may be evenly spread out over the spectrum of the varying rates, effectively reducing the electromagnetic interference, reducing the total jitter, reducing the data loss and enhancing the data security.

Figure 12B:
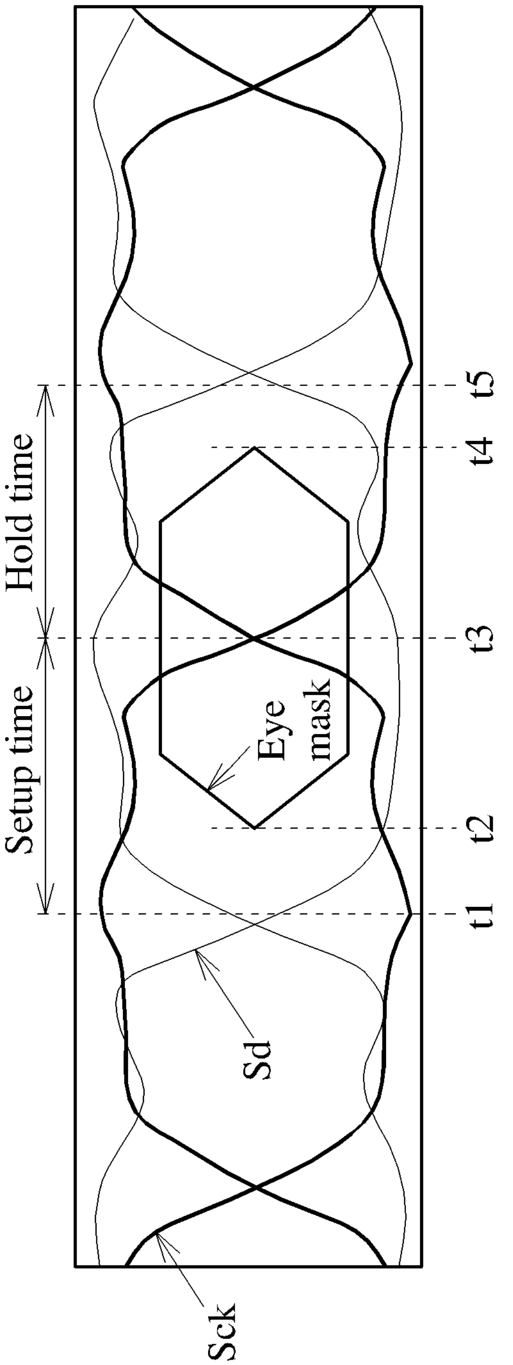
FIG. 12B shows an eye diagram of the display device in FIG. 12A.

FIG. 12B shows the waveforms of the clock signal Sck and the data signal Sd and an eye mask of the display device 12. The clock signal Sck and the data signal Sd are both differential signals, and thus each includes an inverting signal and a non-inverting signal. At Time t1, the source drivers 121 to 126 receive a first data bit of the data signal Sd. At Time t3, the source drivers 121 to 126 receive a clock edge of the clock signal Sck. At Time t5, the first data bit ends, and the source drivers 121 to 126 receive a second data bit of the data signal Sd. A time difference between Time t3 and Time t1 may be referred to as the setup time, and a time difference between Time t5 and Time t3 may be referred to as the hold time. The mini-LVDS interfere specification defines an eye mask for defining the minimum setup time and the minimum hold time. A time difference between Time t3 and Time t2 may be referred to as the minimum setup time, and a time difference between Time t4 and Time t3 may be referred to as the minimum hold time. In order to ensure accurate data sampling, the setup time and the hold time must exceed the minimum setup time and the minimum hold time, respectively. The setup time and the hold time may vary owing to the jitter in the data signal Sd and the jitter in the clock signal Sck. The sum of the jitter in the data signal Sd and the jitter in the clock signal Sck may be referred to as the total jitter. The larger the total jitter is, the shorter the setup time or the hold time is. If the total jitter is too large, the setup time or the hold time will be too short to satisfy the minimum setup time or the minimum hold time, leading to data loss and degrading the performance of the display device 12.

Figure 13:
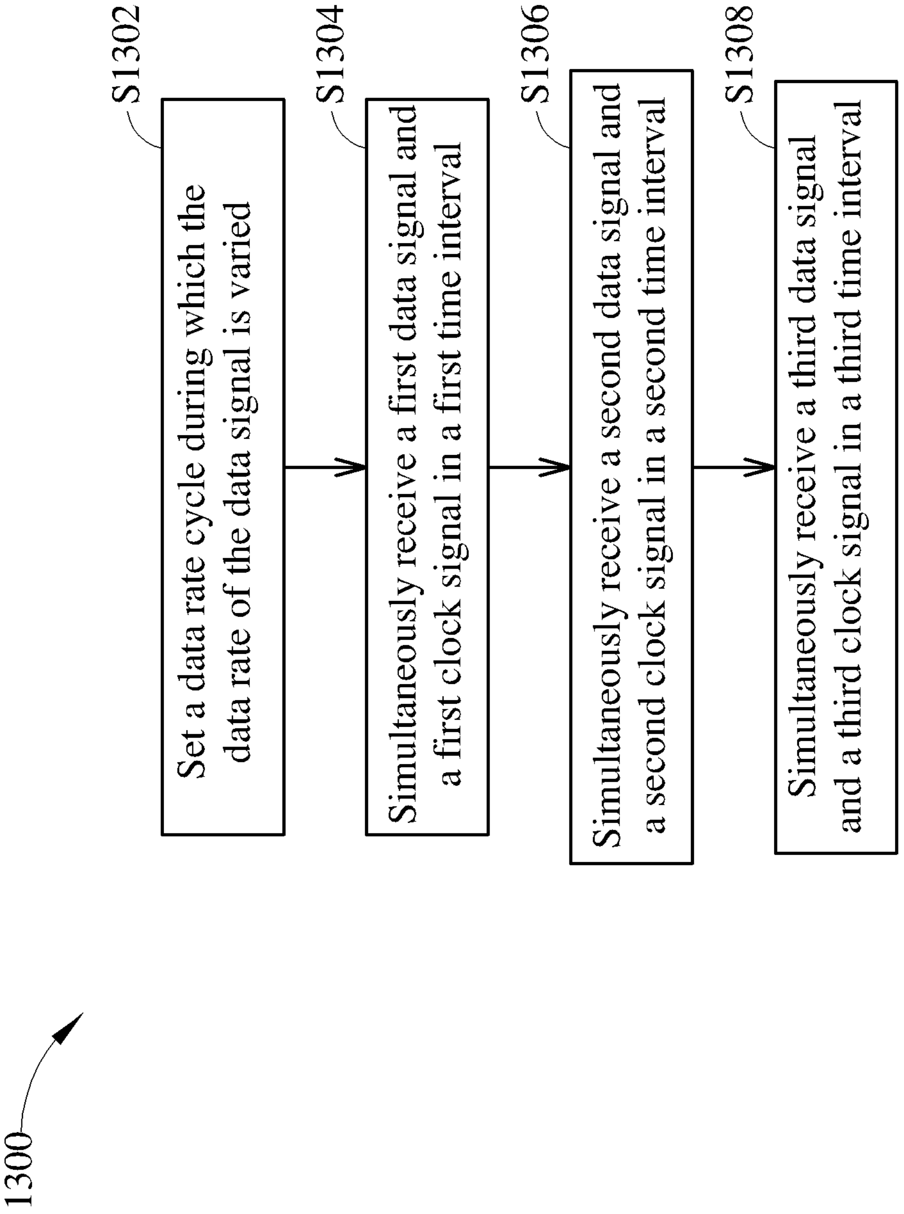
FIG. 13 is flowchart of a method of transmitting signals in a display device in FIG. 12A.

FIG. 13 is flowchart of a method 1300 of transmitting signals in the display device 12 according to an embodiment of the disclosure. The method 1300 includes Steps S1302 to S1308 to vary the data rate of the data signal Sd and the clock rate of the clock signal Sck with time. Any reasonable step change or adjustment is within the scope of the disclosure. Steps S1302 to S1308 are detailed as follows:

Step S1302: The controller 120 sets the data rate cycle;

Step S1304: The source drivers 121 to 126 simultaneously receive the first data signal and the first clock signal in the first time interval;

Step S1306: The source drivers 121 to 126 simultaneously receive the second data signal and the second clock signal in the second time interval;

Step S1308: The source drivers 121 to 126 simultaneously receive the third data signal and the third clock signal in the third time interval.

In Step S1302, the controller 120 sets a data rate cycle during which the data rate of the data signal Sd and the clock rate of the clock signal Sck are varied periodically. The data rate cycle may include a set of time intervals equal or unequal in length. For example, each time interval in the data rate cycle may have a length of 1 line. In another example, a time interval in the data rate cycle may have a length of 2 lines, another time interval in the data rate cycle may have a length of 5 lines, and yet another time interval in the data rate cycle may have a length of 10 lines. In some embodiments, the set of time intervals may include a first time interval, a second time interval and a third time interval, the first time interval, the second time interval and the third time interval being non-overlapping with each other. In some embodiments, the first time interval, the second time interval and the third time interval may be adjacent in sequence.

In Step S1304, the source drivers 121 to 126 simultaneously receive a first data signal generated at a first data rate from the controller 120 via the data line Ld and receive a first clock signal at a first clock rate from the controller 120 via the clock line Lck in the first time interval. That is, the source drivers 121 to 126 receive the first data signal via the data line Ld while receiving the first clock signal via the clock line Lck in the first time interval.

In Step S1306, the source drivers 121 to 126 simultaneously receive a second data signal generated at a second data rate from the controller 120 via the data line Ld and receive a second clock signal at a second clock rate from the controller 120 via the clock line Lck in the second time interval. That is, the source drivers 121 to 126 receive the second data signal via the data line Ld while receiving the second clock signal via the clock line Lck in the second time interval.

In Step S1308, the source drivers 121 to 126 simultaneously receive a third data signal generated at a third data rate from the controller 120 via the data line Ld and receive a third clock signal at a third clock rate from the controller 120 via the clock line Lck in the third time interval. That is, the source drivers 121 to 126 receive the third data signal via the data line Ld while receiving the third clock signal via the clock line Lck in the third time interval.

The data signal Sd may include the first data signal, the second data signal and the third data signal, and the data rate may include the first data rate, the second data rate and the third data rate, the first data rate, the second data rate and the third data rate being different from each other. Similarly, the clock signal Sck may include the first clock signal, the second clock signal and the third clock signal, and the clock rate may include the first clock rate, the second clock rate and the third clock rate, the first clock rate, the second clock rate and the third clock rate matching the first data rate, the second data rate and the third data rate, respectively. In some embodiments, the first data rate may be equal to the first clock rate, the second data rate may be equal to the second clock rate, and the third data rate may be equal to the third clock rate.

In general, the larger the difference between the data rates of two adjacent time intervals is, the less the interference is. For example, a difference of 50 MHz between the first data rate and the second data rate may result in less interference than a difference of 5 MHz between the first data rate and the second data rate. The data rate cycle may be frame-based or line-based. For the frame-based data rate cycle, the data rate cycle and each time interval in the data rate cycle are measured by frames. During the frame-based data rate cycle, the source drivers 121 to 126 may receive a first number of frames, and during each time interval of the set of time intervals in the frame-based data rate cycle, the source drivers 121 to 126 may receive a second number of frames. The first number and the second number may be positive integers, and the first number may exceed the second number. For example, if the first number may be 21 and the second number may be 1, the source drivers 121 to 126 may receive 21 frames in each data rate cycle, and receive 1 frame in each time interval, as illustrated in FIG. 14A. Details of FIG. 14A will be explained in the subsequent paragraph. In another example, if the first number may be 20 and the second number may be 2, the source drivers 121 to 126 may receive 20 frames in the data rate cycle, and receive 2 frames in each time interval.

Figure 14B:
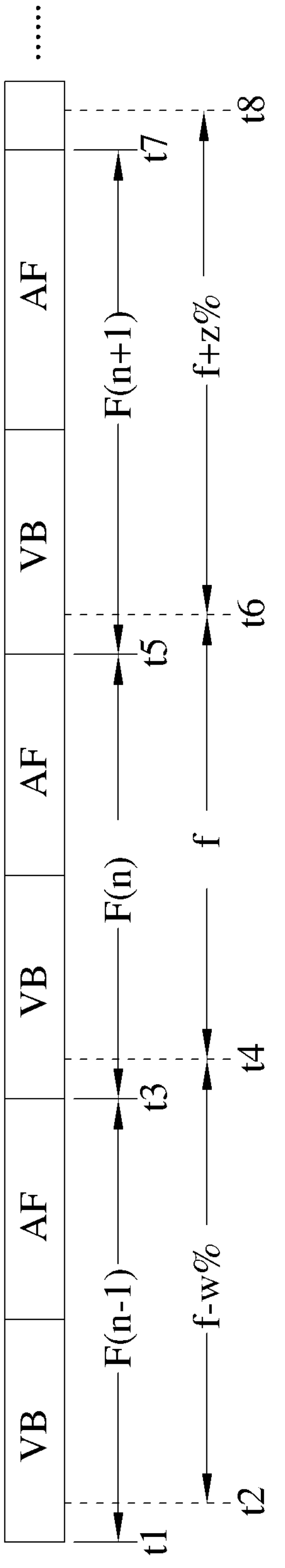
Figure 14C:
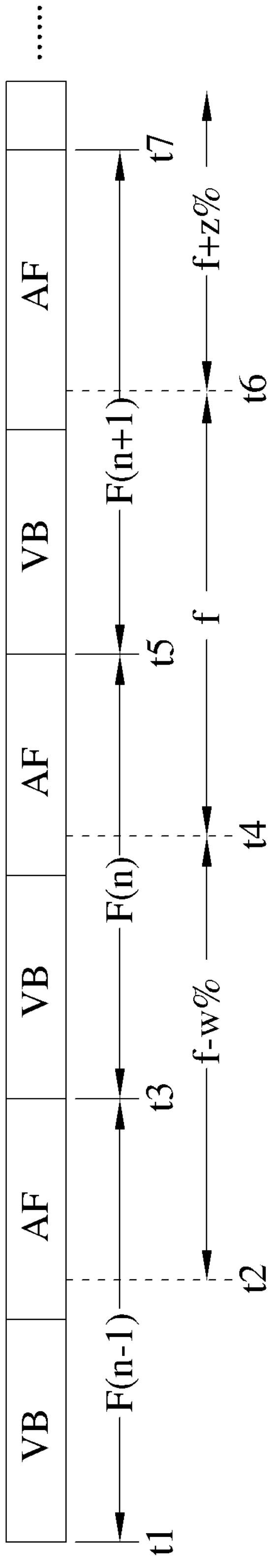

FIGS. 14A, 14B and 14C are schematic diagrams of the frame-based data rate cycle for use in the display device 12 according to various embodiments of the invention.

In FIG. 14A, the frame-based data rate cycle includes a set of time intervals of 21 frames (Frames 1 to 21), and each time interval has a duration of 1 frame. During the frame-based data rate cycle, the data rate of the data signal Sd is adjusted over a range of plus or minus 25% from a central data rate of 870 MHz. During each time interval in the frame-based data rate cycle, the data rate of the data signal Sd is adjusted by a difference of 5% of the central data rate from a preceding data rate. In the embodiment, the data rate of the data signal Sd is increased from the minimum data rate of 653 MHz up to the maximum data rate of 1088 MHz from Frames 1 to 11, and then decreased from the maximum data rate of 1088 MHz down to the minimum data rate of 653 MHz from Frames 11 to 21, with the data rate in each time interval being different from a preceding time interval by a 43.5 MHz (=870*5%). For example, the data rate of the data signal Sd in the first time interval (Frame 1) is 653 MHz, the data rate of the data signal Sd in the second time interval (Frame 2) is 696 MHz (~653+43.5), and the data rate of the data signal Sd in the third time interval (Frame 3) is 740 MHz (~696+43.5). The minimum data rate may be determined by the frame rate, the resolution, the number of channels (e.g., red, green and blue channels), and the number of source drivers of the display device 12. The maximum data rate may be determined by the smallest one among the maximum data rates of the controller 120 and the source drivers 121 to 126.

In FIGS. 14B and 14C, a frame F(n−1) may be transmitted between Time t1 and Time t3, a frame F(n) may be transmitted between Time t3 and Time t5, and a frame F(n+1) may be transmitted between Time t5 and Time t7, n being a positive integer. For example, n=5, and the 3 consecutive frames are frames F(4), F(5) and F(6). Each frame may include a vertical blanking interval VB and an active video interval AF. While FIGS. 14B and 14C show 3 consecutive frames F(n−1), F(n) and F(n+1), the 3 frames may also be nonconsecutive. In some embodiments, the 3 frames may be frame F(n−x), F(n) and F(n+y), with x, y being non-zero numbers, and x being equal or different from y. For example, n=5, x=2, y=3, and the 3 frames are frames F(3), F(5) and F(8).

In FIG. 14B, the first time interval, the second time interval and the third time interval start in the vertical blanking intervals VB of the frames F(n−1) to F(n+1). The first time interval may occur between Time t2 and Time t4, the second time interval may occur between Time t4 and Time t6, and the third time interval may occur between Time t6 and Time t8. In the first time interval, the first data rate of the first data signal may be f−w %; in the second time interval, the second data rate of the second data signal may be f, and in the third time interval, the third data rate of the third data signal may be f+z %, where f is a positive number, w and z are non-zero numbers, and w is equal or different from z.

In some embodiments, the first data rate f−w % and the second data rate f differ by a non-zero fixed difference w %, and the second data rate f and the third data rate (f+z %) differ by the non-zero fixed difference z %, that is, w=z. For example, f=870 MHz, w %=z %=5%, the first data rate is 827 MHz(=870-870*5%), the second data rate is 870 MHz, and the third data rate is 914 MHz(=870+870*5%).

In other embodiments, the first data rate f−w % and the second data rate f differ by a first non-zero random difference w %; and the second data rate f and the third data rate (f+z %) differ by a second non-zero random difference z %, that is, wiz. For example, f=870 MHz, w %=8% and z %=6%, the first data rate is 800 MHz(=870-870*8%), the second data rate is 870 MHz, and the third data rate is 922 MHz(=870+870*6%).

Since each time interval starts at the vertical blanking interval VB of a frame (e.g., t2 starts at VB), the data signal Sd may have sufficient time (e.g., from t2 to the start of AF) to stabilize before receiving active video data in the active video interval AF of the frame.

In FIG. 14C, the first time interval, the second time interval and the third time interval start in the active video intervals AF of the frames F(n−1) to F(n+1). The first time interval may occur between Time t2 and Time t4, the second time interval may occur between Time t4 and Time t6, and the third time interval may occur from Time t6 to an ending time. In the first time interval, the first data rate of the first data signal may be f−w %; in the second time interval, the second data rate of the second data signal may be f, and in the third time interval, the third data rate of the third data signal may be f+z %, where f may be a positive number, w and z may be non-zero numbers, and w may be equal or different from z.

In some embodiments, the first data rate f−w % and the second data rate f differ by a non-zero fixed difference w %, and the second data rate f and the third data rate (f+z %) differ by the non-zero fixed difference z %, that is, w=z. For example, f=870 MHz, w %=z %=5%, the first data rate is 827 MHz(=870-870*5%), the second data rate is 870 MHz, and the third data rate is 914 MHz(=870+870*5%).

In other embodiments, the first data rate f−w % and the second data rate f differ by a first non-zero random difference w %; and the second data rate f and the third data rate (f+z %) differ by a second non-zero random difference z %, that is, wiz. For example, f=870 MHz, w %=8% and z %=6%, the first data rate is 800 MHz(=870-870*8%), the second data rate is 870 MHz, and the third data rate is 922 MHz(=870+870*6%).

Since each time interval starts at the active video interval AF of a frame, the controller 120 may have more flexibility to change the data rate of the data signal Sd.

For the line-based data rate cycle, the data rate cycle and each time interval in the data rate cycle are measured by rows. During the line-based data rate cycle, the source drivers 121 to 126 may receive a first number of rows, and during each time interval of the set of time intervals in the line-based data rate cycle, the source drivers 121 to 126 may receive a second number of rows. The first number and the second number may be positive integers, and the first number may exceed the second number. For example, if the first number may be 21 and the second number may be 1, the source drivers 121 to 126 may receive 21 lines in the data rate cycle, and receive 1 line in each time interval. In another example, if the first number may be 20 and the second number may be 2, the source drivers 121 to 126 may receive 20 lines in the data rate cycle, and receive 2 lines in each time interval.

Figure 15A:
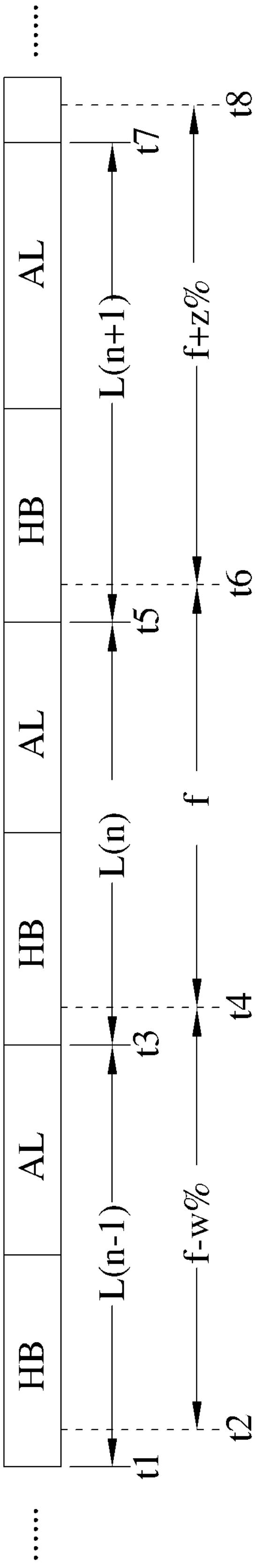
FIG. 15A and FIG. 15B are schematic diagrams of the line-based data rate cycle for use in the display device in FIG. 12A according to various embodiments of the invention.
Figure 15B:
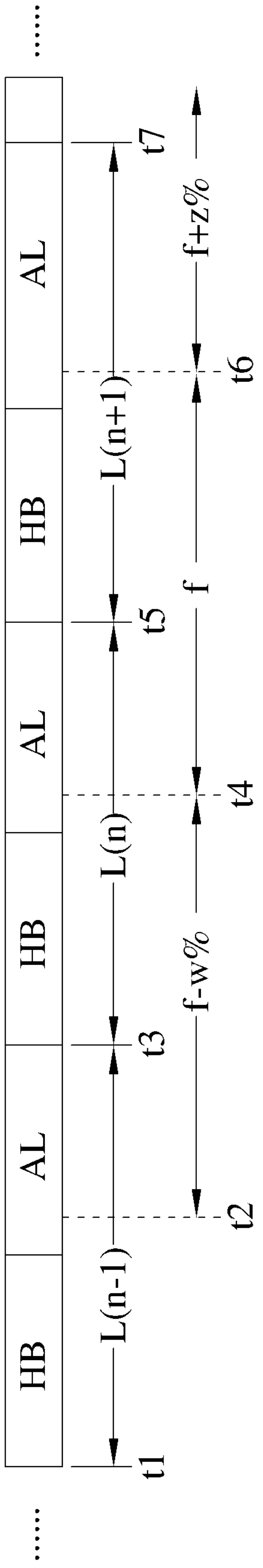

FIGS. 15A and 15B are schematic diagrams of transmitting signals using the line-based data rate cycle in the display device 12. In FIGS. 15A and 15B, a row L(n−1) may be transmitted between Time t1 and Time t3, a row L(n) may be transmitted between Time t3 and Time t5, and a row L(n+1) may be transmitted between Time t5 and Time t7, n being a positive integer. For example, n=5, and the 3 consecutive rows are Rows L(4), L(5) and L(6). Each row may include a horizontal blanking interval HB and an active video interval AL. While FIGS. 15A and 15B show 3 consecutive rows L(n−1), L(n) and L(n+1), the 3 rows may also be nonconsecutive. In some embodiments, the 3 rows may be Row L(n−x), L(n) and L(n+y), with x, y being non-zero numbers, and x being equal or different from y. For example, n=5, x=2, y=3, and the 3 rows are Rows L(3), L(5) and L(8).

In FIG. 15A, the first time interval, the second time interval and the third time interval start in the horizontal blanking intervals HB of the rows L(n−1) to L(n+1). The first time interval may occur between Time t2 and Time t4, the second time interval may occur between Time t4 and Time t6, and the third time interval may occur between Time t6 and Time t8. In the first time interval, the first data rate of the first data signal may be f−w %; in the second time interval, the second data rate of the second data signal may be f, and in the third time interval, the third data rate of the third data signal may be f+z %, where f is a positive number, w and z are non-zero numbers, and w is equal or different from z.

In some embodiments, the first data rate f−w % and the second data rate f differ by a non-zero fixed difference w %, and the second data rate f and the third data rate (f+z %) differ by the non-zero fixed difference z %, that is, w=z. For example, f=870 MHz, w %=z %=5%, the first data rate is 827 MHz(=870-870*5%), the second data rate is 870 MHz, and the third data rate is 915 MHz(=870+870*5%).

In other embodiments, the first data rate f−w % and the second data rate f differ by a first non-zero random difference w %; and the second data rate f and the third data rate (f+z %) differ by a second non-zero random difference z %, that is, wiz. For example, f=870 MHz, w %=8% and z %=6%, the first data rate is 800 MHz(=870-870*8%), the second data rate is 870 MHz, and the third data rate is 922 MHz(=870+870*6%).

Since each time interval starts at the horizontal blanking interval HB of a row (e.g., t2 starts at HB), the data signal Sd may have sufficient time (e.g., from t2 to the start of AL) to stabilize before receiving active video data in the active video interval AL of the row.

In FIG. 15B, the first time interval, the second time interval and the third time interval start in the active video intervals AL of the rows L(n−1) to L(n+1). The first time interval may occur between Time t2 and Time t4, the second time interval may occur between Time t4 and Time t6, and the third time interval may occur from Time t6 to an ending time. In the first time interval, the first data rate of the first data signal may be f−w %; in the second time interval, the second data rate of the second data signal may be f, and in the third time interval, the third data rate of the third data signal may be f+z %, where f may be a positive number, w and z may be non-zero numbers, and w may be equal or different from z.

In some embodiments, the first data rate f−w % and the second data rate f differ by a non-zero fixed difference w %, and the second data rate f and the third data rate (f+z %) differ by the non-zero fixed difference z %, that is, w=z. For example, f=870 MHz, w %=z %=5%, the first data rate is 827 MHz(=870-870*5%), the second data rate is 870 MHz, and the third data rate is 915 MHz(=870+870*5%).

In other embodiments, the first data rate f−w % and the second data rate f differ by a first non-zero random difference w %; and the second data rate f and the third data rate (f+z %) differ by a second non-zero random difference z %, that is, wiz. For example, f=870 MHz, w %=8% and z %=6%, the first data rate is 800 MHz(=870-870*8%), the second data rate is 870 MHz, and the third data rate is 922 MHz(=870+870*6%).

Since each time interval starts at the active video interval AL of a row, the controller 120 may have more flexibility to change the data rate of the data signal Sd.

Figure 16:
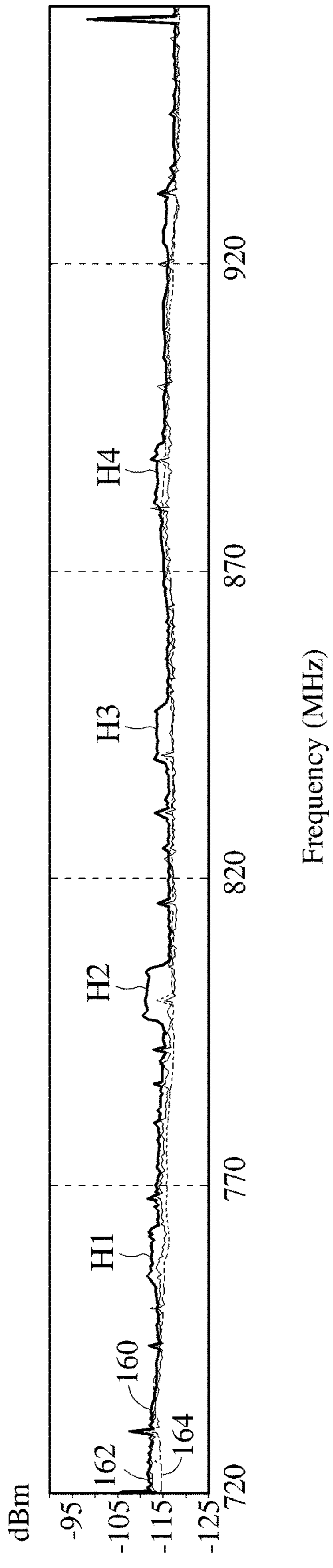
FIG. 16 shows the frequency response of display devices.

FIG. 16 shows the frequency responses of display devices, where the horizontal axis represents frequency in MHz, the vertical axis represents the magnitude in decibel-milliwatt (dBm). Specifically, FIG. 16 shows a conventional data signal 160 employing a constant data rate as in a conventional display device, a new data signal 162 employing the varying data rate as in the display device 12, and a background noise signal 164 representing the background noise on the data line Ld in the display device 12. The conventional data signal 160 shows humps H1 to H4, with the hump H1 indicating an excessive gain between 720 MHz and 770 MHz, the hump H2 indicating an excessive gain between 770 MHz and 820 MHz, the hump H3 indicating an excessive gain between 820 MHz and 870 MHz, and the hump H4 indicating an excessive gain between 870 MHz and 920 MHz. The humps H1 to H4 are generated in the conventional data signal 160 owing to energy accumulation of data transmissions at the constant data rate and the harmonic frequencies, producing significant electromagnetic interference. In contrast, the new data signal 162 shows no hump across the spectrum of 720 MHz to 920 MHz owing to the energy of data transmissions being evenly spread out over the spectrum by the varying data rate, reducing the electromagnetic interference, reducing the total jitter, reducing the data loss and enhancing the data security.

Figure 17:
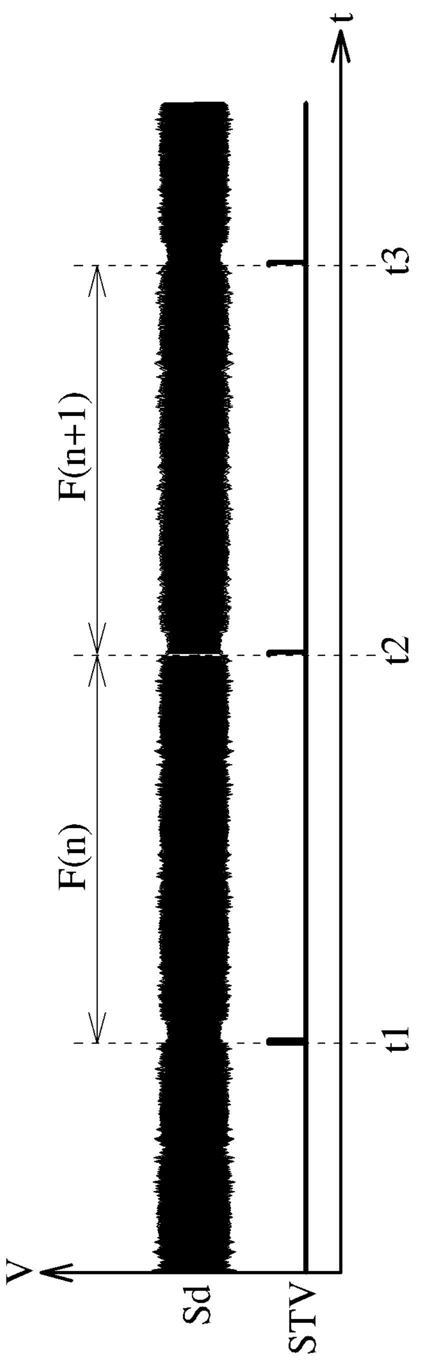
FIG. 17 shows waveforms of the signals in the display device in FIG. 12A adopting the frame-based data rate cycle.

FIG. 17 shows waveforms of the data signal Sd and a vertical start pulse signal STV in the display device 12 adopting the frame-based data rate cycle, with the data rate of the data signal Sd being adjusted in each frame, the vertical axis representing voltage V, and the horizontal axis representing time t. The vertical start pulse signal STV includes a pulse upon the start of each frame.

At Time t1, a first pulse occurs in the vertical start pulse signal STV, indicating the start of a frame F(n). Between Time t1 and Time t2, the data of the frame F(n) is transmitted on the data signal Sd at a first data rate. At Time t2, a second pulse occurs in the vertical start pulse signal STV, indicating the start of a frame F(n+1). Between Time t2 and Time t3, the data of the frame F(n+1) is transmitted on the data signal Sd at a second data rate. At Time t3, a third pulse occurs in the vertical start pulse signal STV, indicating the start of a subsequent frame. The first data rate is different from the second data rate, thereby reducing the electromagnetic interference, reducing the total jitter, reducing the data loss and enhancing the data security.

Figure 18:
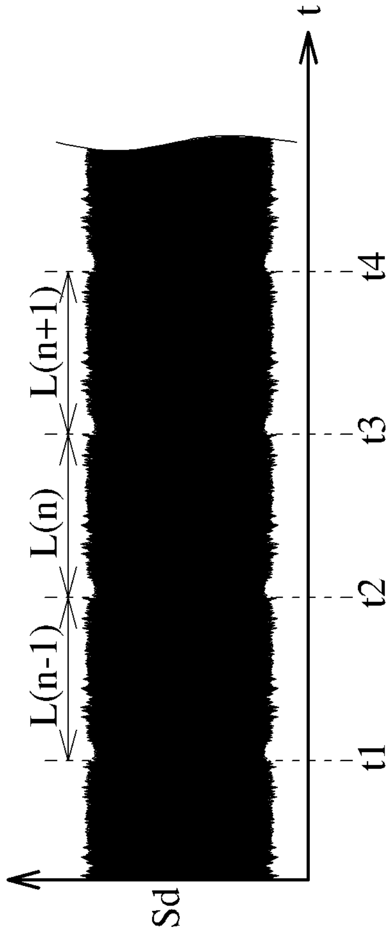
FIG. 18 shows a waveform of the signal in the display device in FIG. 12A adopting the line-based data rate cycle.

FIG. 18 shows waveforms of the data signal Sd in the display device 12 adopting the line-based data rate cycle, with the data rate of the data signal Sd being adjusted in each row.

Between Time t1 and Time t2, the data of the row L(n−1) is transmitted on the data signal Sd at a first data rate.

Between Time t2 and Time t3, the data of the row L(n) is transmitted on the data signal Sd at a second data rate.

Between Time t3 and Time t4, the data of the row L(n+1) is transmitted on the data signal Sd at a third data rate. The first data rate, the second data rate and the third data rate are different from each other, thereby reducing the electromagnetic interference, reducing the total jitter, reducing the data loss and enhancing the data security.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of transmitting signals in a display device, the method comprising:

at least one source driver simultaneously receiving a first data signal and a first clock signal in a first time interval in a frame, wherein the first data signal is generated at a first data rate, and the first clock signal operates at a first clock rate matching the first data rate; and the at least one source driver simultaneously receiving a second data signal and a second clock signal in a second time interval in the frame, wherein the second data signal is generated at a second data rate different from the first data rate, the second clock signal operates at a second clock rate matching the second data rate, and the second time interval is non-overlapping with the first time interval;

wherein at least one of the first time interval and the second time interval starts in an active video interval.

2. The method of claim 1, wherein:

the display device includes a controller, the at least one source driver, a data line and a clock line, the controller being coupled to the at least one source driver via the data line and the clock line; and simultaneously receiving the first data signal and the first clock signal in the first time interval comprises:

the at least one source driver simultaneously receiving the first data signal from the controller via the data line and receiving the first clock signal from the controller via the clock line in the first time interval.

3. The method of claim 2, wherein:

simultaneously receiving the second data signal and the second clock signal in the second time interval comprises:

the at least one source driver simultaneously receiving the second data signal from the controller via the data line and receiving the second clock signal from the controller via the clock line in the second time interval.

4. The method of claim 2, wherein the at least one source driver includes N source drivers, N being a positive integer exceeding 1.

5. The method of claim 2, further comprising:

the controller setting a data rate cycle comprising a set of time intervals during which a data rate of a data signal is varied periodically, the set of time intervals comprising the first time interval and the second time interval, the data signal comprising the first data signal and the second data signal, and the data rate comprising the first data rate and the second data rate.

6. The method of claim 5, wherein during the data rate cycle the at least one source driver receives a first number of frames; and during each time interval of the data rate cycle the at least one source driver receives a second number of frames, the first number and the second number being positive integers and the first number exceeding the second number.

7. The method of claim 5, wherein during the data rate cycle the at least one source driver receives a first number of rows; and during each time interval of the data rate cycle the at least one source driver receives a second number of rows, the first number and the second number being positive integers and the first number exceeding the second number.

8. The method of claim 1, wherein the first time interval is adjacent to the second time interval.

9. The method of claim 1, further comprising:

simultaneously receiving a third data signal and a third clock signal in a third time interval, the third data signal being generated at a third data rate, the third data rate being different from the first data rate and the second data rate, and the third time interval being non-overlapping with the first time interval and the second data rate.

10. The method of claim 9, wherein:

the first data rate and the second data rate differ by a non-zero fixed difference; and the second data rate and the third data rate differ by the non-zero fixed difference.

11. The method of claim 9, wherein:

the first data rate and the second data rate differ by a first non-zero random difference; and the second data rate and the third data rate differ by a second non-zero random difference.

12. The method of claim 9, wherein:

a start of the first time interval and a start of the second time interval differ by a non-zero fixed difference; and the start of the first time interval and a start of the third time interval differ by the non-zero fixed difference.

13. The method of claim 9, wherein:

a start of the first time interval and a start of the second time interval differ by a first non-zero random difference; and the start of the first time interval and a start of the third time interval differ by a second non-zero random difference.

14. A display device comprising:

a controller;

a data line;

a clock line;

N source drivers coupled to the controller via the data line and the clock line to:

simultaneously receive a first data signal and a first clock signal in a first time interval in a frame, wherein the first data signal is generated at a first data rate, and the first clock signal operates at a first clock rate matching the first data rate; and simultaneously receive a second data signal and a second clock signal in a second time interval in the frame, wherein the second data signal is generated at a second data rate different from the first data rate, the second clock signal operates at a second clock rate matching the second data rate, and the second time interval is non-overlapping with the first time interval;

wherein N is a positive integer exceeding 1; and at least one of the first time interval and the second time interval starts in an active video interval.

15. The display device of claim 14, wherein:

the controller sets a data rate cycle comprising a set of time intervals during which a data rate of a data signal is varied periodically, the set of time intervals comprising the first time interval and the second time interval, the data signal comprising the first data signal and the second data signal, and the data rate comprising the first data rate and the second data rate.

16. The display device of claim 15, wherein during the data rate cycle, the N source drivers receive a first number of frames; and during each time interval of the data rate cycle, the N source drivers receive a second number of frames, the first number and the second number being positive integers and the first number exceeding the second number.

17. The display device of claim 15, wherein during the data rate cycle, the N source drivers receive a first number of rows; and during each time interval of the data rate cycle, the N source drivers receive a second number of rows, the first number and the second number being positive integers and the first number exceeding the second number.

18. The display device of claim 14, wherein the first time interval is adjacent to the second time interval.

19. The display device of claim 14, wherein:

the N source drivers further simultaneously receives a third data signal and a third clock signal in a third time interval, the third data signal being generated at a third data rate, the third data rate being different from the first data rate and the second data rate, and the third time interval being non-overlapping with the first time interval and the second data rate.

20. The display device of claim 19, wherein:

the first data rate and the second data rate differ by a non-zero fixed difference; and the second data rate and the third data rate differ by the non-zero fixed difference.

21. The display device of claim 19, wherein:

the first data rate and the second data rate differ by a first non-zero random difference; and the second data rate and the third data rate differ by a second non-zero random difference.

22. The display device of claim 19, wherein:

a start of the first time interval and a start of the second time interval differ by a non-zero fixed difference; and the start of the first time interval and a start of the third time interval differ by the non-zero fixed difference.

23. The display device of claim 19, wherein:

a start of the first time interval and a start of the second time interval differ by a first non-zero random difference; and the start of the first time interval and a start of the third time interval differ by a second non-zero random difference.

* * * * *